(12) United States Patent
Yamaki et al.

(10) Patent No.: US 7,077,987 B2
(45) Date of Patent: Jul. 18, 2006

(54) FOAM INJECTION MOLDING METHOD

(75) Inventors: Hiroshi Yamaki, Kawasaki (JP); Yuji Tanaka, Yokosuka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 247 days.

(21) Appl. No.: 10/450,417

(22) PCT Filed: Dec. 26, 2001

(86) PCT No.: PCT/JP01/11473

§ 371 (c)(1),
(2), (4) Date: Jun. 13, 2003

(87) PCT Pub. No.: WO02/053347

PCT Pub. Date: Jul. 11, 2002

(65) Prior Publication Data

US 2004/0108612 A1 Jun. 10, 2004

(30) Foreign Application Priority Data

Dec. 27, 2000 (JP) .............................. 2000-396891

(51) Int. Cl.
*B29C 44/02* (2006.01)
*B29C 44/06* (2006.01)

(52) U.S. Cl. ................. 264/45.5; 264/50; 264/500; 264/572

(58) Field of Classification Search ........... 264/45.5, 264/50, 572, 500
See application file for complete search history.

(56) References Cited

U.S. PATENT DOCUMENTS 4,129,635 A 12/1978 Yasuike et al.
4,208,368 A * 6/1980 Egli ........................ 264/45.5
5,093,053 A * 3/1992 Eckardt et al. ............ 264/45.1
5,798,063 A * 8/1998 Bender et al. ............. 264/45.5
5,948,446 A 9/1999 Hori (Continued)

FOREIGN PATENT DOCUMENTS

JP 7-32405 12/1975

(Continued)

*Primary Examiner*—Allan R. Kuhns
(74) *Attorney, Agent, or Firm*—Birch, Stewart, Kolasch & Birch, LLP

(57) ABSTRACT

Disclosed is a method for foam-injection molding a thermoplastic resin, comprising: (1) providing a mold comprising a fixed mold half and a movable mold half mating with the fixed mold half to thereby form a mold cavity defined by an inner wall of the fixed mold half and an inner wall of the movable mold half, wherein the mold cavity has an inner wall which has a molten resin releasing means, (2) injecting a foamable thermoplastic resin in a molten form into the mold cavity of the mold, thereby forming a foamable molten resin mass in the mold cavity, (3) applying a pressure to the foamable molten resin mass in the mold cavity to press the surface of the foamable molten resin mass against the inner wall of the mold cavity, thereby allowing a surface portion of the foamable molten resin mass to be solidified to form a surface skin layer of the foamable molten resin mass, and (4) releasing a portion of the foamable molten resin mass under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed.

12 Claims, 6 Drawing Sheets

U.S. PATENT DOCUMENTS 6,299,807 B1 * 10/2001 Kimura et al. ............. 264/45.5

FOREIGN PATENT DOCUMENTS

| JP | 53-25352 | 12/1975 |
| JP | 08-118388 A | 5/1996 |
| JP | 2659415 B2 | 6/1997 |
| JP | 11-138577 A | 5/1999 |
| JP | 2000-094468 A | 4/2000 |

* cited by examiner

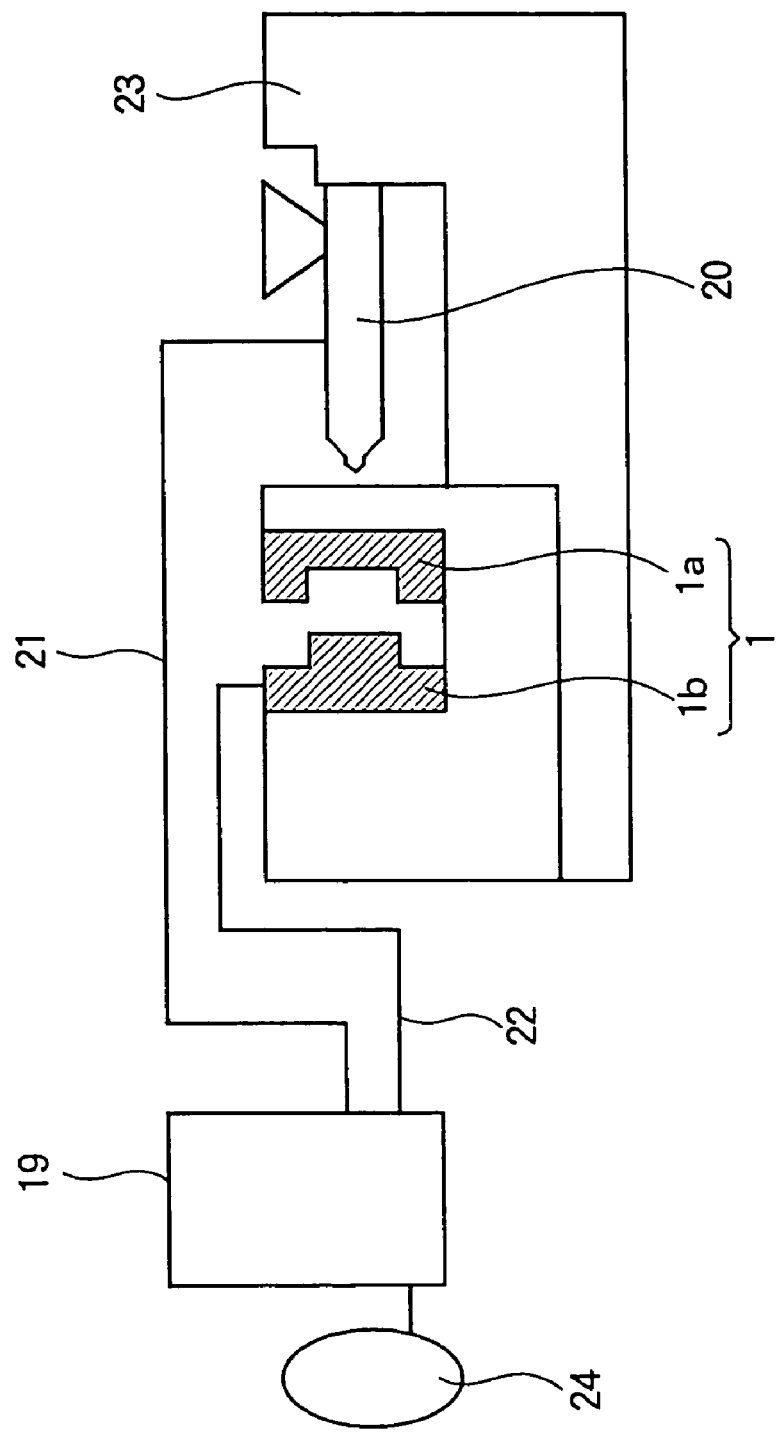

FOAM INJECTION MOLDING METHOD

This application is the national phase under 35 U.S.C. § 371 of PCT International Application No. PCT/JP01/11473 which has an International filing date of Dec. 26, 2001, which designated the United States of America.

BACKGROUND OF THE INVENTION

1. Field of the Invention

The present invention relates to a method for foam-injection molding a thermoplastic resin. More particularly, the present invention is concerned with a method for foam-injection molding a thermoplastic resin to produce a foamed molded article having a substantially non-foamed, surface skin layer, wherein the method comprises: (1) providing a mold comprising a fixed mold half and a movable mold half mating with the fixed mold half to thereby form a mold cavity defined by an inner wall of the fixed mold half and an inner wall of the movable mold half, wherein the mold cavity has an inner wall which has a molten resin releasing means, (2) injecting a foamable thermoplastic resin in a molten form into the mold cavity of the mold, thereby forming a foamable molten resin mass in the mold cavity, (3) applying a pressure to the foamable molten resin mass in the mold cavity to press the surface of the foamable molten resin mass against the inner wall of the mold cavity, thereby allowing a surface portion of the foamable molten resin mass to be solidified to form a surface skin layer of the foamable molten resin mass, and (4) releasing a portion of the foamable molten resin mass under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed. The foam-injection molding method of the present invention is advantageous not only in that a molded article which exhibits excellent reproduction of the morphology of the inner wall of the mold cavity and which has both a non-foamed surface skin layer and a highly foamed interior portion can be produced with excellent reproducibility and high efficiency and economically, but also in that the thickness of the surface skin layer and the expansion ratio of the molded article can be easily controlled. The foam-injection molding method of the present invention can provide various excellent foam-injection molded articles of a thermoplastic resin at a low cost. Examples of such molded articles include a housing for light electrical equipment or electronic equipment, various automobile parts, and every day commodities. Further, the foam-injection molding method of the present invention can be advantageously used not only for molding ordinary thermoplastic resins, but also for molding various resin compositions which contain a flame retardant having a low thermal stability and hence which cannot be molded at high molding temperatures, and for molding various resins having such a low fluidity that it is difficult to mold the resins by a conventional injection molding method.

2. Prior Art

For the production of a foamed molded article, conventional foam-injection molding methods are known which include a step of foaming a foamable thermoplastic resin containing a foaming agent. In the conventional foam-injection molding methods, azodicarbonamide (ADCA), N,N'-dinitrosopentamethylenetetramine (DPT) or the like is generally used as the foaming agent in an amount in the range of from 1 to 5 parts by weight, relative to 100 parts by weight of the resin.

As a representative example of the above-mentioned conventional foam-injection molding methods, a method called "short shot method" can be mentioned. In this method, a molten resin containing a foaming agent is injected into a mold cavity in an amount corresponding to a volume which is less than the volume of the mold cavity. When a molten resin is injected into a mold cavity, a forward portion of the injected molten resin, which first contacts with the inner wall of the mold cavity, is quickly cooled to thereby form a solidified layer. Then, a backward portion of the injected molten resin flows through the central portion of the mold cavity along the solidified layer, then reaches and passes through the flow front of the solidified layer, and then goes toward and finally contacts with the inner wall of the mold cavity, where the molten resin is cooled to thereby form a new solidified layer. Such flow behavior of the injected molten resin in the mold cavity is called a "fountain flow". After the injection, the molten resin in the mold cavity foams and expands until it reaches the inner periphery of the mold cavity to thereby fill up the mold cavity and form a foamed molded article. This so-called "short shot method" is a simplest form of foam-injection molding method and is widely employed, although this method poses a problem in that the surface of the obtained molded article becomes rough due to the occurrence of foaming at the flow front of the injected molten resin.

On the other hand, as a method for obtaining a large-thickness, foamed molded article having excellent appearance and exhibiting less occurrence of a sink mark or warping, there is known a conventional foam-injection molding method which is generally called a "counter pressure method". An example of a counter pressure method is described in Examined Japanese Patent Application Publication No. Sho 62-16166. The counter pressure method comprises a step of injecting a molten resin containing a foaming agent into a mold cavity filled with a compressed air, wherein the amount of the injected molten resin is a "short shot", relative to the volume of the mold cavity; a step of releasing the compressed air from the mold cavity to the outside of the mold; and a step of cooling the molten resin in the mold cavity while keeping the molten resin under a low pressure. By this method, the flow front of the injected molten resin can be prevented from foaming, so that there can be obtained a foamed molded article in which the surface is free of a foam mark and only the interior portion is foamed. In the counter pressure method, a foamable molten resin is injected into a mold cavity so that the mold cavity is almost filled with the injected foamable molten resin in non-foamed condition, and then, the injected molten resin is cooled and hence shrinks while exhibiting foaming expansion to compensate for the volume decrease due to the shrinkage. In this method, basically, the foaming agent is used in a minimum amount which can cause a foaming expansion sufficient for compensating for the volume decrease due to the shrinkage. Therefore, this method has a problem in that, since the molten resin cannot be pressed against the inner wall of the mold cavity under a high pressure, the obtained molded article exhibits poor reproduction of the morphology of the inner wall of the mold cavity, and a poor appearance. This method has also a problem in that the foaming expansion is caused only to such an extent as is sufficient for compensating for the volume decrease due to the shrinkage, a great reduction in the weight of the molded article cannot be obtained. Further, there is also a problem in that, when the foaming agent is used in too large an amount, the obtained molded article continues foaming even after the article is taken out from the mold cavity, thus causing an expansion or distortion of the obtained molded article. For preventing this problem, it is necessary that the cooling time (i.e., the time for which the injected molten resin is left to cool in the mold cavity) be extremely long.

A further example of the above-mentioned conventional foam-injection molding methods is as follows. An old method is known which comprises a step of injecting a foamable molten resin into a mold cavity, a step of introducing a gas into the injected molten resin to thereby form a hollow mass of molten resin, a step of allowing the hollow mass to stand until its outer surface portion is solidified, and a step of releasing the introduced gas to the outside of the mold, thereby causing the inner portion of the hollow mass to foam and expand inwardly to fill the hollow (see Examined Japanese Patent Application Publication No. Sho 53-25352 (corresponding to U.S. Pat. No. 4,129,635)). This method has the following disadvantages. The introduced gas (which was used for forming the hollow) is released through the gas outlet (which is the same as the gas inlet through which the gas is introduced); however, due to a great pressure loss inside pipes or the like connected to the gas outlet (inlet), it takes a long time to release the introduced gas through the gas outlet (inlet). Hence, the solidification of the inner portion of the hollow mass of molten resin progresses to a great extent before the gas has been completely released, resulting in that the molten resin cannot form a foamed interior portion having a satisfactory size. Further, in the case where the foamable molten resin has a high content of a foaming agent and hence has a high foamability, when the inner portion of the hollow mass of molten resin is caused to foam by the release of the gas through the gas outlet (inlet), foaming occurs also at a portion of the molten resin around the gas outlet (inlet), leading to a clogging of the gas outlet by the foam. As a result, the gas used for forming the hollow cannot be smoothly and completely released to the outside of the mold, leading to a problem in that an internal gas pressure remains in the hollow even at the end of the cooling time, and the remaining internal pressure will cause the obtained molded article to burst when the mold is opened for taking-out of the molded article from the mold cavity.

Also, there have recently been proposed methods which are similar to the above-mentioned foam-injection molding method in which a hollow mass of a foamable molten resin is first produced and then foaming of the hollow mass is caused to occur. For example, such methods are described in Unexamined Japanese Patent Application Laid-Open Specification No. Hei 7-32405 (corresponding to U.S. Pat. Nos. 5,900,198 and 5,948,446) and Unexamined Japanese Patent Application Laid-Open Specification No. 2000-94468. Disclosed in the former (i.e., Unexamined Japanese Patent Application Laid-Open Specification No. Hei 7-32405) is a method for producing an injection-molded hollow resin article which has a hollow in a large thickness portion thereof and which has gas cells interspersed between the surface skin layer and the hollow portion, wherein the resin article exhibits less occurrence of a sink mark in the surface thereof. In this method, a foamable molten resin is injected into a mold cavity which is pressurized with a first high pressure gas, and a second high pressure gas is introduced into the injected molten resin during or after the injection of the molten resin, to thereby form a hollow in the injected molten resin. Then, the high pressure gas in the mold cavity is released to the outside of the mold, to thereby cause the foamable molten resin to foam and expand inwardly into the hollow. As in the case of the above-mentioned method disclosed in Examined Japanese Patent Application Publication No. Sho 53-25352 (corresponding to U.S. Pat. No. 4,129,635), this method has problems not only in that it takes a long time to release the gas used for forming the hollow, thus making it impossible to form a foamed portion having a satisfactory size, but also in that occurrence of foaming around the gas outlet causes a clogging of the gas outlet and hence hinders the release of the gas, leading to an occurrence of bursting of the obtained molded article due to the pressure of a residual gas.

On the other hand, the latter of the above-mentioned two documents (i.e., Unexamined Japanese Patent Application Laid-Open Specification No. 2000-94468) discloses a method for producing a lightweight molded article which has a substantially non-foamed surface skin layer and a foamed interior portion and which exhibits excellent appearance, high strength and high stiffness. In this method, a molten resin containing a foaming agent is injected into a mold cavity so as to fill the mold cavity, and a pressurized gas is introduced into the injected molten resin so as to release a portion of the injected molten resin into a resin release cavity (which is called a "spillover cavity"), to thereby form a hollow, followed by releasing of the pressurized gas in the hollow to lower the gas pressure. This method has a defect in that, even when a portion of the injected molten resin is released into the resin release cavity, the gas in the hollow remains under a high pressure; as a result, although the gas in the hollow is released thereafter, substantially the same problems as in the case of the other (described above) of the two documents are posed (namely, the problems that the injected molten resin cannot form a foamed portion having a satisfactory size, and bursting of the obtained molded article is caused by the pressure of a residual gas).

As apparent from the above, there has not yet been known a foam-injection molding method which is advantageous in that a high expansion ratio of the obtained molded article can be obtained to thereby achieve a decrease in weight of the molded article and a decrease in the time of molding cycle, while maintaining excellent appearance and high dimensional accuracy of the molded article.

Further, with respect to the case of a molding operation in which a plurality of molded articles are obtained in one molding cycle, the conventional foam-injection molding methods have the following disadvantages. In the case where it is intended to obtain two or more molded articles at a time by using a mold designed for such purpose (i.e., having a plurality of mold cavities for molding a plurality of articles at a time), when it is desired for the plurality of molded articles to have the same expansion ratio, it is necessary that, with respect to the molding conditions, such as the amount of resin injected into each mold cavity and the resin pressure, a good balance be achieved between the plurality of mold cavities of the mold. However, it is difficult to achieve such a good balance between the plurality of mold cavities of the mold. Especially, when four or more molded articles are produced at a time by the conventional molding methods, in most cases, it is impossible to achieve a good balance (with respect to the molding conditions) between the plurality of mold cavities of the mold, and hence it is almost impossible for the plurality of molded articles to have the same expansion ratio. Further, when a plurality of molded articles having varied volumes are produced at a time by using a single mold (having a plurality of mold cavities having varied volumes), it is even more difficult to achieve a good balance (with respect to the molding conditions) between the plurality of mold cavities of the mold. For these reasons, at present, production of a plurality of foam-injection molded articles simultaneously in one molding cycle is not employed in the large scale production of foam-injection molded articles.

An object of the present invention is to provide a method for producing a lightweight, foamed molded article which exhibits excellent reproduction of the morphology of the inner wall of the mold cavity and which has a high dimensional accuracy, at a high productivity and at a low cost.

SUMMARY OF THE INVENTION

In this situation, the present inventors have made extensive and intensive studies with a view toward solving above-mentioned problems of the prior art. As a result, it has unexpectedly been found that, this objective can be attained by a method for foam-injection molding a thermoplastic resin, which comprises: (1) providing a mold comprising a fixed mold half and a movable mold half mating with the fixed mold half to thereby form a mold cavity defined by an inner wall of the fixed mold half and an inner wall of the movable mold half, wherein the mold cavity has an inner wall which has a molten resin releasing means, (2) injecting a foamable thermoplastic resin in a molten form into the mold cavity of the mold, thereby forming a foamable molten resin mass in the mold cavity, (3) applying a pressure to the foamable molten resin mass in the mold cavity to press the surface of the foamable molten resin mass against the inner wall of the mold cavity, thereby allowing a surface portion of the foamable molten resin mass to be solidified to form a surface skin layer of the foamable molten resin mass, and (4) releasing a portion of the foamable molten resin mass under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed. Namely, it has been found that the above-mentioned foam-injection molding method is advantageous not only in that a molded article which exhibits excellent reproduction of the morphology of the inner wall of the mold cavity and which has both a non-foamed surface skin layer and a highly foamed interior portion can be produced with excellent reproducibility and high efficiency and economically, but also in that the thickness of the surface skin layer and the expansion ratio of the molded article can be easily controlled. Based on these findings, the present invention has been completed.

Accordingly, it is a primary object of the present invention to provide an excellent foam-injection molding method which is advantageous not only in that a molded article which exhibits excellent reproduction of the morphology of the inner wall of the mold cavity and which has both a non-foamed surface skin layer and a highly foamed interior portion can be produced with excellent reproducibility and high efficiency and economically, but also in that the thickness of the surface skin layer of and the expansion ratio of the molded article can be easily controlled.

The foregoing and other objects, features and advantages of the present invention will be apparent from the following detailed description taken in connection with the accompanying drawings and the appended claims.

BRIEF DESCRIPTION OF THE DRAWINGS

In the drawings:

FIG. 1(a) is a diagrammatic cross-sectional view showing the inside of one form of a mold used in the first embodiment of method of the present invention, as illustrated in a state before a foamable molten resin is injected into the mold cavity;

FIG. 1(b) is a diagrammatic cross-sectional view showing the inside of one form of a mold used in the first embodiment of method of the present invention, as illustrated in a state after a foamable molten resin has been injected into the mold cavity to form a foamable molten resin mass;

FIG. 1(c) is a diagrammatic cross-sectional view showing the inside of one form of a mold used in the first embodiment of method of the present invention, as illustrated in a state after an operation in which a molten resin releasing means (an openable/closable valve 4) is opened to thereby release a portion of the foamable molten resin mass to a molten resin release cavity, thereby causing the foamable molten resin mass in the mold cavity to foam;

FIG. 2(a) is a diagrammatic cross-sectional view showing the inside of one form of a mold used in the second embodiment of method of the present invention, as illustrated in a state which occurs during an operation in which a foamable molten resin is injected into the mold cavity;

FIG. 2(b) is a diagrammatic cross-sectional view showing the inside of one form of a mold used in the second embodiment of method of the present invention, as illustrated in a state in which, after completion of the injection of the foamable molten resin into the mold cavity to form a foamable molten resin mass in the mold cavity, a pressurized gas is introduced into the foamable molten resin mass to form a gas-filled hollow in the foamable molten resin mass;

FIG. 2(c) is a diagrammatic cross-sectional view showing the inside of one form of a mold used in the second embodiment of method of the present invention, as illustrated in a state after an operation in which a molten resin releasing means (an openable/closable valve 4) is opened to thereby release a portion of the foamable molten resin mass and the pressurized gas in the gas-filled hollow to a molten resin release cavity, thereby causing the foamable molten resin mass in the mold cavity to foam;

FIG. 3(a) is a diagrammatic cross-sectional view showing the inside of the mold used in Example 6, as illustrated in a state before a foamable molten resin is injected into the mold cavity;

FIG. 3(b) is a diagrammatic cross-sectional view showing the inside of the mold used in Example 6, as illustrated in a state after a foamable molten resin has been injected into the mold cavity to form a foamable molten resin mass;

FIG. 3(c) is a diagrammatic cross-sectional view showing the inside of the mold used in Example 6, as illustrated in a state in which, after completion of the injection of the foamable molten resin into the mold cavity to form a foamable molten resin mass in the mold cavity, a pressurized gas is introduced into the foamable molten resin mass to form a gas-filled hollow in the foamable molten resin mass;

FIG. 3(d) is a diagrammatic cross-sectional view showing the inside of the mold used in Example 6, as illustrated in a state after an operation in which a molten resin releasing means (an openable/closable valve 4) is opened to thereby release a portion of the foamable molten resin mass and the pressurized gas in the gas-filled hollow to a molten resin release cavity, thereby causing the foamable molten resin mass in the mold cavity to foam;

FIG. 5 is a diagrammatic view of the injection molding machine used in the Examples and Comparative Examples.

DESCRIPTION OF REFERENCE NUMERALS AND CHARACTERS

Figure 1:
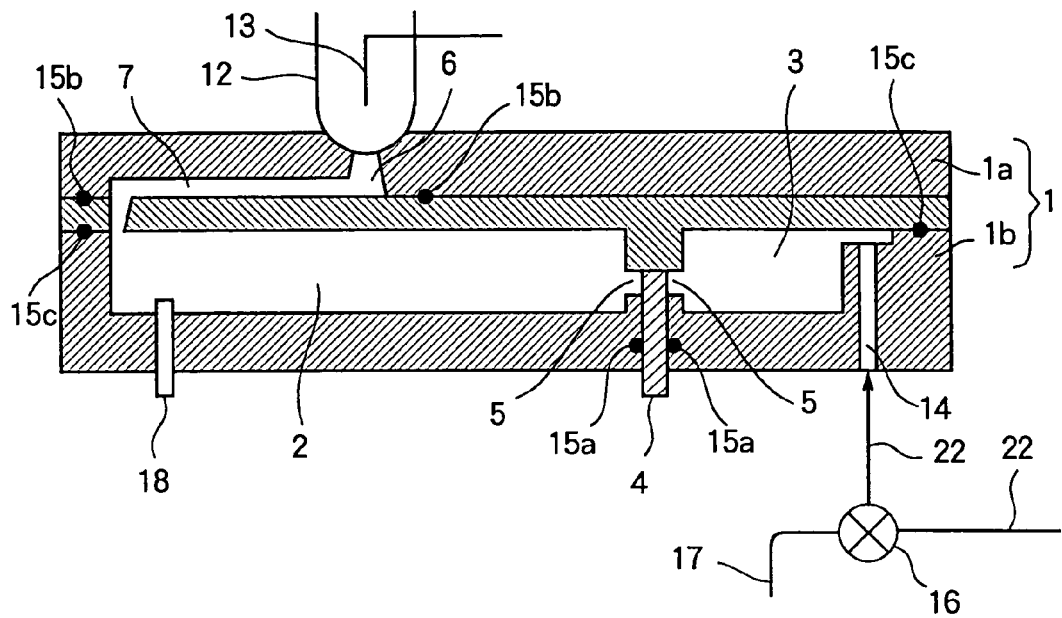
FIG. 1(a) to FIG. 1(c) are diagrammatic views showing a first embodiment of method of the present invention.
Figure 1:
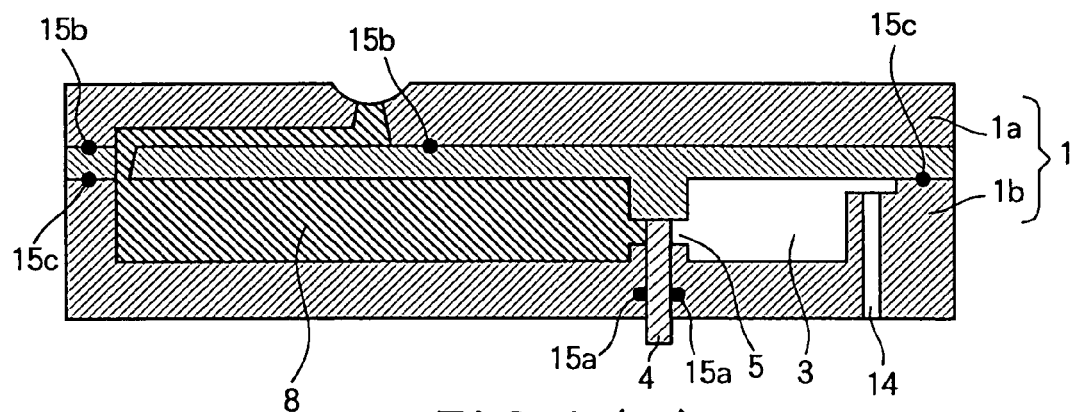
Figure 1:
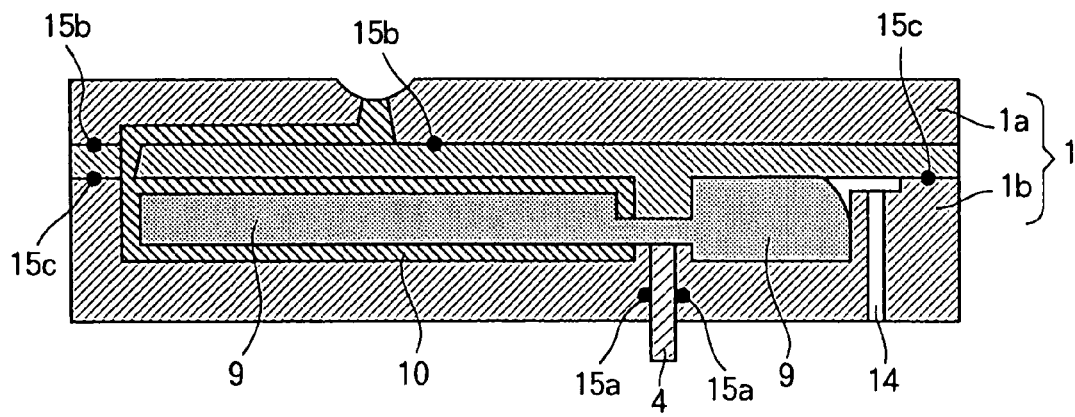
Figure 2:
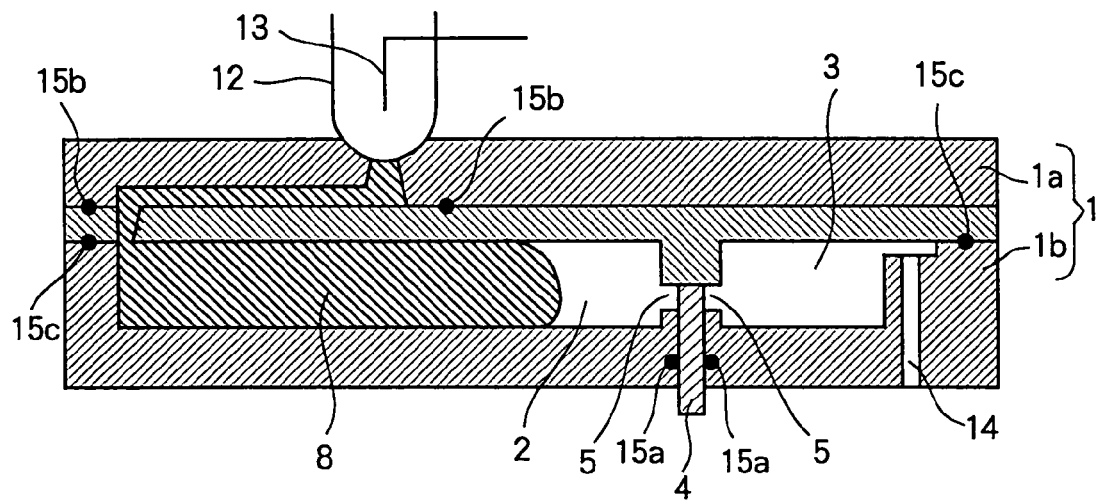
FIG. 2(a) to FIG. 2(c) are diagrammatic views showing an example of a second embodiment of method of the present invention.
Figure 2:
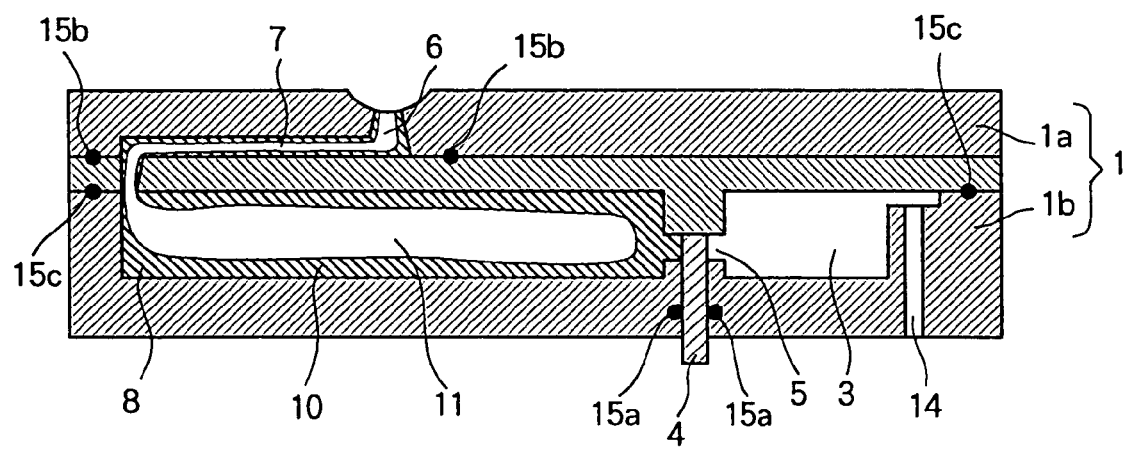
Figure 2:
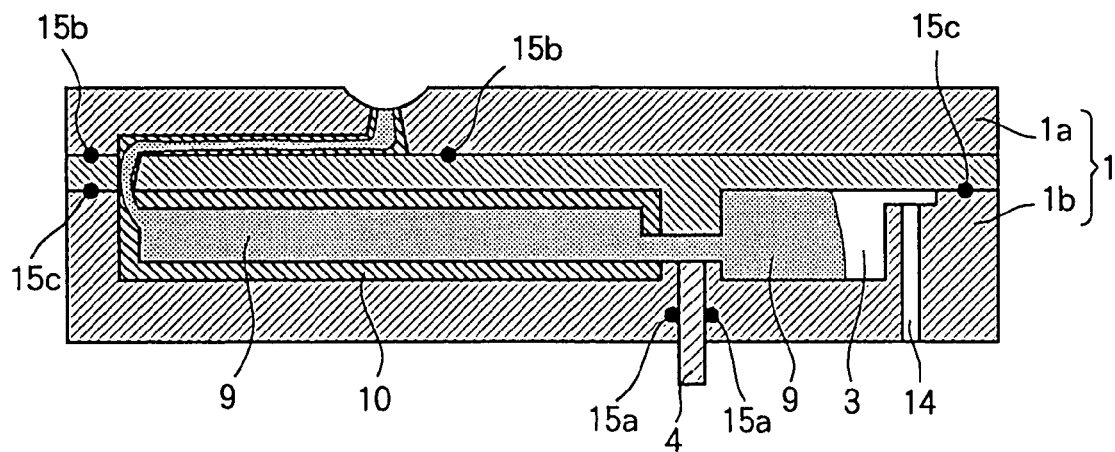

1: Mold
1a: Fixed mold half
1b: Movable mold half
2: Mold cavity
3: Molten resin release cavity
4: Molten resin releasing means (openable/closable valve)
5: Communication passage
6: Sprue
7: Runner
8: Foamable molten resin
9: Foamed resin mass (foam)
10: Surface skin layer
11: Gas-filled hollow
12: Injection nozzle
13: Pressurized gas nozzle
14: Counter gas inlet (gas passage)
15a to 15c: O-ring
16: Three-way valve for feeding counter gas
17: Line communicating with a counter gas release outlet
18: Gas inlet
19: Gas supply control device
20: Injection cylinder
21: Gas introduction line for a foamable molten resin
22: Counter gas introduction line for a mold
23: Injection molding machine
24: Source of carbon dioxide gas or nitrogen gas In FIG. 1(a) to FIG. 5, like parts or portions are designated by like numerals or characters.

DETAILED DISCRIPTION OF THE INVENTION

In one aspect of the present invention, there is provided a method for foam-injection molding a thermoplastic resin, comprising:

(1) providing a mold comprising a fixed mold half and a movable mold half mating with the fixed mold half to thereby form a mold cavity defined by an inner wall of the fixed mold half and an inner wall of the movable mold half, the mold cavity having an inner wall and communicating with a resin inlet, the inner wall of the mold cavity having a molten resin releasing means, (2) injecting a foamable thermoplastic resin in a molten form, under preselected injection temperature and pressure conditions, into the mold cavity of the mold through the resin inlet in an amount which is in the range of from 95 to 110%, preferably from 98 to 105%, of the weight of the foamable molten resin having a resin volume equal to the volume of the mold cavity, wherein the resin volume is as measured under the preselected injection temperature and pressure conditions, thereby forming a foamable molten resin mass in the mold cavity, (3) applying a pressure to the foamable molten resin mass in the mold cavity to press the surface of the foamable molten resin mass against the inner wall of the mold cavity, thereby allowing a surface portion of the foamable molten resin mass to be solidified to form a surface skin layer of the foamable molten resin mass, and (4) releasing a portion of the foamable molten resin mass under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed.

In another aspect of the present invention, there is provided a method for foam-injection molding a thermoplastic resin, comprising:

(1) providing a mold comprising a fixed mold half and a movable mold half mating with the fixed mold half to thereby form a mold cavity defined by an inner wall of the fixed mold half and an inner wall of the movable mold half, the mold cavity having an inner wall and communicating with a resin inlet and optionally with a gas inlet, the inner wall of the mold cavity having a molten resin releasing means, (2) injecting a foamable thermoplastic resin in a molten form, under preselected injection temperature and pressure conditions, into the mold cavity of the mold through the resin inlet in an amount which is in the range of from 55 to 110%, preferably from 60 to 100%, of the weight of the foamable molten resin having a resin volume equal to the volume of the mold cavity, wherein the resin volume is as measured under the preselected injection temperature and pressure conditions, thereby forming a foamable molten resin mass in the mold cavity, (3) introducing a pressurized gas, through the resin inlet or the gas inlet, into the foamable molten resin mass in the mold cavity to form a gas-filled hollow in the foamable molten resin mass, thereby exerting a pressure on the foamable molten resin mass to press the outer surface of the foamable molten resin mass against the inner wall of the mold cavity, thereby allowing an outer surface portion of the foamable molten resin mass to be solidified to form a surface skin layer of the foamable molten resin mass, wherein the step (3) is performed during step (2), after completion of step (2), or during and after step (2), and (4) releasing a portion of the foamable molten resin mass and at least a portion of the pressurized gas in the gas-filled hollow, under the foaming pressure exerted by the foamable molten resin mass and the pressure of the pressurized gas in the gas-filled hollow, to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed.

For easy understanding of the present invention, the essential features and various preferred embodiments of the present invention are enumerated below.

1. A method for foam-injection molding a thermoplastic resin, comprising:

(1) providing a mold comprising a fixed mold half and a movable mold half mating with the fixed mold half to thereby form a mold cavity defined by an inner wall of the fixed mold half and an inner wall of the movable mold half, the mold cavity having an inner wall and communicating with a resin inlet, the inner wall of the mold cavity having a molten resin releasing means, (2) injecting a foamable thermoplastic resin in a molten form, under preselected injection temperature and pressure conditions, into the mold cavity of the mold through the resin inlet in an amount which is in the range of from 95 to 110% of the weight of the foamable molten resin having a resin volume equal to the volume of the mold cavity, wherein the resin volume is as measured under the preselected injection temperature and pressure conditions, thereby forming a foamable molten resin mass in the mold cavity, (3) applying a pressure to the foamable molten resin mass in the mold cavity to press the surface of the foamable molten resin mass against the inner wall of the mold cavity, thereby allowing a surface portion of the foamable molten resin mass to be solidified to form a surface skin layer of the foamable molten resin mass, and (4) releasing a portion of the foamable molten resin mass under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed.

2. The method according to item 1 above, wherein the application of a pressure to the foamable molten resin mass in step (3) is effected by injecting an additional amount of foamable molten resin into the mold cavity, thereby applying a predetermined resin holding pressure to the foamable molten resin mass.

3. The method according to item 1 or 2 above, wherein, before step (2) and after step (1), a pressurized gas is introduced to the mold cavity so that the mold cavity is caused to have a pressure such that, in step (2), foaming of the foamable molten resin injected into the mold cavity does not occur at a flow front thereof.

4. The method according to item 3 above, wherein the pressurized gas introduced to the mold cavity before step (2) and after step (1) is carbon dioxide gas.

5. The method according to any one of items 1 to 4 above, wherein the molten resin releasing means of the mold cavity is an openable/closable valve, and wherein the mold has a molten resin release cavity which communicates with the mold cavity through the openable/closable valve, the volume of the molten resin release cavity being larger than the volume of the portion of the foamable molten resin mass which is released through the openable/closable valve to the outside of the mold cavity in step (4).

6. The method according to item 5 above, wherein the molten resin release cavity has a gas passage communicating with the outside of the mold.

7. The method according to any one of items 1 to 6 above, wherein the foamable molten resin comprises a molten resin and, dissolved therein, at least one gaseous foaming agent which is selected from the group consisting of carbon dioxide gas and nitrogen gas.

8. The method according to item 7 above, wherein the content of the foaming agent in the foamable molten resin is in the range of from 0.05 to 10% by weight.

9. A method for foam-injection molding a thermoplastic resin, comprising:

(1) providing a mold comprising a fixed mold half and a movable mold half mating with the fixed mold half to thereby form a mold cavity defined by an inner wall of the fixed mold half and an inner wall of the movable mold half, the mold cavity having an inner wall and communicating with a resin inlet and optionally with a gas inlet, the inner wall of the mold cavity having a molten resin releasing means, (2) injecting a foamable thermoplastic resin in a molten form, under preselected injection temperature and pressure conditions, into the mold cavity of the mold through the resin inlet in an amount which is in the range of from 55 to 110% of the weight of the foamable molten resin having a resin volume equal to the volume of the mold cavity, wherein the resin volume is as measured under the preselected injection temperature and pressure conditions, thereby forming a foamable molten resin mass in the mold cavity, (3) introducing a pressurized gas, through the resin inlet or the gas inlet, into the foamable molten resin mass in the mold cavity to form a gas-filled hollow in the foamable molten resin mass, thereby exerting a pressure on the foamable molten resin mass to press the outer surface of the foamable molten resin mass against the inner wall of the mold cavity, thereby allowing an outer surface portion of the foamable molten resin mass to be solidified to form a surface skin layer of the foamable molten resin mass, wherein the step (3) is performed during step (2), after completion of step (2), or during and after step (2), and (4) releasing a portion of the foamable molten resin mass and at least a portion of the pressurized gas in the gas-filled hollow, under the foaming pressure exerted by the foamable molten resin mass and the pressure of the pressurized gas in the gas-filled hollow, to the outside of the mold cavity through the molten resin releasing means, thereby lowering the pressure exerted on the foamable molten resin mass, so that foaming of the foamable molten resin mass in the mold cavity is caused to occur to form a foamed resin mass having the surface skin layer remaining substantially non-foamed.

10. The method according to item 9 above, wherein the pressurized gas used in step (3) is carbon dioxide gas.

11. The method according to item 9 or 10 above, wherein, before step (2) and after step (1), a pressurized gas is introduced to the mold cavity so that the mold cavity is caused to have a pressure such that, in step (2), foaming of the foamable molten resin injected into the mold cavity does not occur at a flow front thereof.

12. The method according to item 11 above, wherein the pressurized gas introduced to the mold cavity before step (2) and after step (1) is carbon dioxide gas.

13. The method according to any one of items 9 to 12 above, wherein the molten resin releasing means of the mold cavity is an openable/closable valve, and wherein the mold has a molten resin release cavity which communicates with the mold cavity through the openable/closable valve, the volume of the molten resin release cavity being larger than the volume of the portion of the foamable molten resin mass which is released through the openable/closable valve to the outside of the mold cavity in step (4).

14. The method according to item 13 above, wherein the molten resin release cavity has a gas passage communicating with the outside of the mold.

15. The method according to any one of items 9 to 14 above, wherein the foamable molten resin comprises a molten resin and, dissolved therein, at least one gaseous foaming agent which is selected from the group consisting of carbon dioxide gas and nitrogen gas.

16. The method according to item 15 above, wherein the content of the foaming agent in the foamable molten resin is in the range of from 0.05 to 10% by weight.

As is apparent from the above, the present invention provides a first embodiment of method (first method) and a second embodiment of method (second method). In step (3) of the first method, the application of a pressure to the foamable molten resin mass in the mold cavity is effected without using a pressurized gas (wherein, instead of using a pressurized gas, a resin holding pressure is applied). In step (3) of the second method, the application of a pressure to the foamable molten resin mass in the mold cavity is effected using a pressurized gas. In step (2) of the first method, the amount of the foamable molten resin injected into the mold cavity is in the range of from 95 to 110%, preferably from 98 to 105%, of the weight of the foamable molten resin having a resin volume equal to the volume of the mold cavity, wherein the resin volume is as measured under the preselected injection temperature and pressure conditions. In step (2) of the second method, the amount of the foamable molten resin injected into the mold cavity is in the range of from 55 to 110%, preferably from 60 to 100%, of the weight of the foamable molten resin having a resin volume equal to the volume of the mold cavity, wherein the resin volume is as measured under the preselected injection temperature and pressure conditions. With respect to the reason why the amount of the foamable molten resin injected into the mold cavity can exceed 100% of the weight of the foamable molten resin having a resin volume equal to the volume of the mold cavity, is that the molten resin is compressed under the injection pressure. In the present invention, the term "injection temperature" means the temperature of the cylinder of the molding machine, and the temperature of the cylinder of the molding machine is almost equal to the temperature of the molten resin injected. In the present invention, the term "injection pressure" means the pressure which is necessary for injecting the molten resin. Hereinafter, the above-defined amount of the molten resin injected is frequently referred to as "mold cavity filling ratio".

Hereinbelow, the present invention is described in detail.

As a result of the extensive and intensive studies performed by the present inventors with a view toward solving the problems of the prior art, the following findings have been obtained. When a specific amount of carbon dioxide gas is dissolved into the molten resin which is used for injection molding, the carbon dioxide gas functions both as a plasticizer and a foaming agent during the molding, wherein, after the molding, the carbon dioxide gas can diffuse into the air without causing distortion of the obtained molded article. Thus, by using carbon dioxide, not only can the viscosity of the molten resin be lowered without alteration of the resin properties, but also the solidification rate of the molten resin can be decreased, thereby facilitating the foam-injection molding. Further, since the molten resin containing carbon dioxide has a high foamability, there can be obtained an advantage in that, even after a resin holding pressure is applied to the foamable molten resin mass in the mold cavity to thereby form a surface skin layer which reproduces the morphology of the inner wall of the mold cavity, it is possible that a portion of the foamable molten resin mass (which is enclosed by the surface skin layer and which is under the foaming pressure exerted by the foamable molten resin mass) breaks through the surface skin layer and is released to the outside of the mold cavity through the molten resin releasing means. Further, since the release of a portion of the molten resin mass can be effected in an extremely short time, the molten resin can exhibit a rapid foaming before completion of the solidification of the molten resin, resulting in advantages not only in that a high expansion ratio can be achieved, but also in that a reduced time of molding cycle can be achieved by virtue of the fact that the generation of the heat of vaporization upon the rapid foaming of the molten resin rapidly cools the molten resin, resulting in a shortening of the cooling time. It has also been found that the obtained foamed molded article has a substantially non-foamed surface skin layer and a foamed interior portion enclosed by the surface skin layer and exhibits an excellent surface appearance and an excellent dimensional accuracy. The present inventors have further found that substantially the same effects as described hereinabove can be obtained even when a foaming agent gas (e.g. nitrogen gas) other than carbon dioxide gas is used in the method of the present invention. Based on these findings, the present invention has been completed.

The present invention is essentially directed to a foam-injection molding method for producing a highly foamed molded article exhibiting an excellent surface appearance and an excellent dimensional accuracy, wherein the method is characterized mainly by a combination of the following two features. One feature is that a foaming agent gas, as represented by carbon dioxide gas, is dissolved into a molten resin mass to thereby lower the solidification temperature of the molten resin and increase the fluidity of the molten resin. The other feature is that the foamable molten resin mass is pressed against the inner wall of the mold cavity by the application of a resin holding pressure or by the introduction of a pressurized gas, and then a portion of the foamable molten resin mass under the foaming pressure exerted by the foamable molten resin mass is released to the outside of the mold cavity through a molten resin releasing means, thereby lowering the pressure exerted on the foamable molten resin mass, so that foaming of the foamable molten resin mass in the mold cavity is caused to occur to form a foamed molten resin mass.

By dissolving a foaming agent gas, such as carbon dioxide gas and the like, into a thermoplastic resin, great advantages can be obtained in that the viscosity of the molten thermoplastic resin is reduced to a level which is much lower than the melt viscosity intrinsic to the thermoplastic resin as measured at the same temperature, and also the solidification temperature of the molten resin is lowered, so that the molten thermoplastic resin exhibits excellent fluidity and high foamability. When the foamable molten resin containing the foaming agent gas is injected into the mold cavity in accordance with a counter pressure method, the foamable molten resin fills the mold cavity in a condition wherein the occurrence of foaming of the foamable molten resin is prevented by the pressurized gas in the mold cavity. Further, when a pressure is applied to the foamable molten resin mass to press the surface of the foamable molten resin mass against the inner wall of the mold cavity, the morphology of the inner wall of the mold cavity can be satisfactorily reproduced in the surface of the foamable molten resin mass; this is because the foamable molten resin has a viscosity which is greatly lowered by the foaming agent gas contained therein. In the method of the present invention, the foamable molten resin mass is strongly pressed against the inner wall of the mold cavity by the resin pressure of the foamable molten resin mass itself injected in a full-shot amount, or by the gas pressure exerted by a gas-filled hollow formed by introducing a pressurized gas into the molten resin mass.

In the method of the present invention, only the surface portion of the foamable molten resin mass is cooled to be solidified at this stage (step (3)), to thereby form a surface skin layer. The obtained surface skin layer is composed of a high density resin and exhibits a non-foamed or only slightly foamed structure (wherein "slightly foamed" means the expansion ratio is 1.01 or lower). When a surface skin layer is formed, no foaming occurs in the surface skin layer. Thus, according to the method of the present invention, it is possible to produce a high quality molded article having no foam pattern in the surface thereof. Further, the thickness of the surface skin layer of the obtained molded article can be easily controlled by adjusting the cooling time. The preferred cooling time is generally in the range of from 0.1 to 2 seconds.

At the time when a surface skin layer is formed, the foamable molten resin mass enclosed by the surface skin layer has a solidification temperature which is lowered by the foaming agent gas dissolved in the foamable molten resin mass, thereby maintaining a satisfactory foamability. In the method of the present invention, a portion of the foamable molten resin mass is released in an instant under the foaming pressure exerted by the foamable molten resin mass to the outside of the mold cavity through the molten resin releasing means, thereby lowering the pressure exerted on the foamable molten resin mass, so that foaming of the foamable molten resin mass in the mold cavity is caused to occur, or, a portion of the foamable molten resin mass and at least a portion of the pressurized gas in the gas-filled hollow are released in an instant, under the foaming pressure exerted by the foamable molten resin mass and the pressure of the pressurized gas in the gas-filled hollow, to the outside of the mold cavity through the molten resin releasing means, thereby lowering the pressure exerted on the foamable molten resin mass, so that foaming of the foamable molten resin mass in the mold cavity is caused to occur.

As described above, according to the method of the present invention, the thickness of the surface skin layer of the obtained molded article and the expansion ratio of the obtained molded article can be easily controlled. For example, it is possible to produce a good molded article having an expansion ratio in the range of from 1.05 to 4.0. Further, it is possible to produce a good lightweight molded article which has a surface skin layer with a thickness which is 20% or less of the thickness of the largest thickness portion of the molded article, or produce a good lightweight molded article which has a thin surface skin layer with a thickness of 1 mm or less and which has a foamed interior portion having an open-cellular structure.

Examples of thermoplastic resins used in the molding method of the present invention include thermoplastic materials, such as a polyethylene, a polypropylene, a polyvinyl chloride, an acrylic resin, a styrene resin, a polyethylene terephthalate, a polybutylene terephthalate, a polyarylate, a polyphenylene ether, a modified polyphenylene ether resin, a peraromatic polyester, a polyacetal, a polycarbonate, a polyether imide, a polyether sulfone, a polyamide resin, a polysulfone, a polyether ether ketone and a polyether ketone, a composition comprising two or more of these thermoplastic resins, and a composition comprising one or more of these thermoplastic resins and one or more fillers. The term "styrene resin" as mentioned above means a homopolymer of styrene, a copolymer containing styrene, or a polymer blend obtained by blending any of a styrene homopolymer and a styrene copolymer with one or more other resins. Preferred example of styrene resins are a polystyrene and an ABS resin. The term "polystyrene" means a styrene homopolymer. Also preferred is a so-called "rubber-reinforced polystyrene", which has a structure in which rubber particles are dispersed in a polystyrene.

In the method of the present invention, especially preferred is a thermoplastic resin which has properties such that the melt viscosity is greatly lowered when a foaming agent gas, especially carbon dioxide, is dissolved into the resin in a molten form. As examples of amorphous thermoplastic resins having such properties, there can be mentioned a styrene resin, a polycarbonate, a polyphenylene ether and a modified polyphenylene ether resin. Among all these thermoplastic resins, a polycarbonate is especially advantageous for use in the method of the present invention, because the use of a polycarbonate has advantages not only in that carbon dioxide exhibits a high solubility in a polycarbonate, but also in that, when a polycarbonate undergoes a thermal decomposition reaction (which is an equilibrium reaction), carbon dioxide is generated, and this means that, when carbon dioxide as a foaming agent is dissolved into the molten polycarbonate, the equilibrium of the decomposition reaction is displaced toward the original system, leading to a lowering of the decomposition rate of the polycarbonate. As a preferred example of a crystalline thermoplastic resin, there can be mentioned a polyamide resin composition containing 10% by weight or more of an inorganic filler, such as a glass fiber. It is more preferred that the polyamide resin contains an aromatic ring.

Further, in the method of the present invention, even various resins which are difficult to process can be easily used, by taking a measure in which a large amount of a foaming agent gas, such as carbon dioxide gas, is used (wherein the term "a large amount of a foaming agent gas" means that, for example, the amount of the foaming agent gas is 0.2% by weight or more, based on the total weight of the foaming agent gas and the resin). Examples of such resins difficult to process include a thermoplastic resin which cannot be injection-molded by a conventional method because it has too high a molecular weight, a thermoplastic resin which has an extremely poor melt fluidity due to the presence of an excess amount of an inorganic filler or the like contained therein, a resin which has a defect in that the resin has a poor thermal stability and is susceptible to a thermal decomposition, a resin which has a defect in that the resin has an extremely high softening temperature and hence the molding of the resin needs to be effected at an extremely high temperature, and a resin containing a thermally unstable additive, such as a flame retardant which is susceptible to a thermal decomposition.

In the method of the present invention, also, even various resins which are generally used in an extrusion molding method but which cannot be used in a conventional injection molding method, can be advantageously used, by taking a measure in which a large amount of a foaming agent gas is used (for example, the foaming agent gas is used in an amount of 0.2% by weight or more, based on the total weight of the foaming agent gas and the resin). Examples of such resins which cannot be used in a conventional injection molding method include thermoplastic resins which cannot be used for a conventional injection molding method because the resins have an extremely poor melt fluidity, an extremely great molecular weight, or an extremely high softening temperature. Specific examples of such thermoplastic resins are as follows:

(1) an acrylic resin having a melt flow rate of 1.0 or lower,
(2) a polystyrene having a melt flow rate of 1.5 or lower,
(3) a rubber-reinforced polystyrene having a melt flow rate of 2.0 or lower,
(4) an ABS resin having a melt flow rate of 3.0 or lower,
(5) a polycarbonate having a melt flow rate of 6.0 or lower, (6) a polyphenylene ether, or a polypheynylene ether resin composition having a polyphenylene ether content of 60% by weight or more,
(7) a polyacetal having a melt flow rate of 5.0 or lower,
(8) a polyethylene having a melt flow rate of 5.0 or lower,
(9) a polypropylene having a melt flow rate of 5.0 or lower, and
(10) a thermoplastic resin containing an easily decomposable flame retardant (e.g. hexabromobiphenyl ether, tribromophenor, or a chlorinated polyethylene).

In the present invention, the term "melt flow rate" is a value as obtained by a measurement in accordance with JIS K-7210. Depending on the type of resin, specific measurement conditions are selected as prescribed in JIS K-7210. Specifically, measurement conditions used for each resin are as follows: condition 15 is used for an acrylic resin, condition 8 is used for a polystyrene and a rubber-reinforced polystyrene, condition 11 is used for an ABS resin, condition 20 is used for a polycarbonate, condition 4 is used for a polyacetal and a polyethylene, and condition 14 is used for a polypropylene. The unit of melt flow rate is g/10 minutes.

Generally, the greater the molecular weight of a thermoplastic resin, the higher the chemical resistance and impact resistance of the molded article produced from the resin, but the lower the melt fluidity of the resin, resulting in difficulty in effecting an injection molding. An extrusion molding method does not require as high a melt fluidity as in the case of an injection molding method, and hence, a high molecular weight polymer is generally used for an extrusion molding method. By the method of the present invention, a foamed molded article which has a small-thickness portion and which exhibits excellent surface appearance, can be produced from a high molecular weight polymer which is conventionally, generally used for an extrusion molding method but not used for an injection molding method. In the present invention, the use of such a high molecular weight polymer becomes possible by a combination of the following two features. One feature is that a large amount of carbon dioxide as foaming agent is dissolved into such a high molecular weight polymer to thereby increase the melt fluidity of the polymer. The other feature is that the foamable molten resin mass is pressed against the inner wall of the mold cavity by the application of a pressure to the foamable molten resin mass, and then a portion of the foamable molten resin mass under the foaming pressure exerted by the foamable molten resin mass is released to the outside of the mold cavity through the molten resin releasing means, thereby lowering the pressure exerted on the foamable molten resin mass, so that foaming of the foamable molten resin mass in the mold cavity is caused to occur to form a foamed molten resin mass.

Examples of thermoplastic resins which cannot be used for an injection molding method because the resins have an extremely high softening temperature, include a polyphenylene ether, and a polyphenylene ether resin composition which contains a polyphenylene ether (PPE) and a styrene polymer (either a polystyrene or a rubber-reinforced polystyrene) in a PPE/styrene polymer weight ratio of from 100:0 to 60:40. Since a polyphenylene ether per se has a poor moldability, a styrene polymer (i.e., a polystyrene or a rubber-reinforced polystyrene) is conventionally, generally added to the polyphenylene ether, in an amount of more than 40% by weight, based on the total weight of the polyphenylene ether and the styrene polymer. However, in the method of the present invention, even a polyphenylene ether or a polyphenylene ether composition containing a styrene polymer (i.e., a polystyrene or a rubber-reinforced polystyrene) in an amount of 40% or less, based on the total weight of the polyphenylene ether and the styrene polymer, can be used for an injection molding when a large amount of a foaming agent gas, such as carbon dioxide, is dissolved into the polyphenylene ether or polyphenylene ether composition (for example, the amount of the foaming agent gas is 0.2% by weight or more, based on the total weight of the foaming agent gas and the polyphenylene ether or polyphenylene ether composition).

Further, the method of the present invention can also be advantageously used for the injection molding of those resins which have a problem in that they have such a high softening temperature or such a low decomposition temperature that when the resins are heated to a temperature at which the resins exhibit a satisfactory melt fluidity, a decomposition or a degradation occurs, causing a deterioration of the resin properties. In the method of the present invention, a high melt fluidity can be imparted to such resins even at a low temperature. Generally, when an amorphous thermoplastic resin is used as the thermoplastic resin in the method of the present invention, the molding of the thermoplastic resin can be effected at a molding temperature which is equal to or lower than "the glass transition temperature of the thermoplastic resin containing no foaming agent gas plus 150° C.". Further, when a crystalline thermoplastic resin is used as the thermoplastic resin, the molding of the thermoplastic resin can be effected at a molding temperature which is equal to or lower than "the melting temperature of the thermoplastic resin containing no foaming agent gas plus 100° C.".

With respect to the foaming agent gas (i.e., gaseous foaming agent) which is dissolved in the thermoplastic resin used in the method of the present invention, there is no particular limitation so long as the gas has a plasticizing effect, i.e., the effect of lowering the melt viscosity of the thermoplastic resin. However, it is preferred that the foaming agent gas exhibits a high solubility in a thermoplastic resin and satisfies the requirements that the gas does not cause a deterioration of any of the thermoplastic resin, the mold and the material of the molding machine; that the gas is not an environmental hazard; that the gas is inexpensive; and that the gas rapidly volatilizes from the molded article after completion of the molding.

Examples of gaseous foaming agents include carbon dioxide gas, nitrogen gas, a saturated hydrocarbon having 1 to 5 carbon atoms, and a fluoroalkane obtained by partially substituting the hydrogen atoms of a saturated hydrocarbon having 1 to 5 carbon atoms with fluorine. Examples of fluoroalkanes include flon gases (i.e., chlorofluorocarbon gases). Among these gaseous foaming agents, preferred are carbon dioxide gas and nitrogen gas, and carbon dioxide gas is most preferred. With respect to the solubility in the resin, nitrogen gas is inferior to carbon dioxide gas, and therefore, nitrogen gas exhibits a relatively low plasticizing effect, as compared to carbon dioxide gas. However, nitrogen gas is advantageous in that nitrogen gas has thermal properties that the higher the temperature, the higher the solubility in the thermoplastic resin and hence the higher the foaming pressure.

It is practically difficult to directly measure the content of the foaming agent gas (i.e., gaseous foaming agent) in the foamable molten resin injected into the mold cavity. Therefore, in the present invention, the content of the foaming agent gas in the foamable molten resin is obtained according to the following method. The weight of the obtained foamed molded article is measured immediately after the molding (the obtained weight is designated a "weight A"). Then, the foamed molded article is allowed to stand in hot air in a hot-air dryer for at least 24 hours to thereby remove the gas remaining in the foamed molded article, wherein, when the foamed molded article is made of an amorphous resin, the hot air is set at a temperature which is equal to or lower than the glass transition temperature of the resin; and, when the foamed molded article is made of a crystalline resin, the hot air is set at a temperature which is about 30° C. lower than the melting temperature of the resin. The weight of the thus treated foamed molded article is measured (the obtained weight is designated a "weight B"). The difference between the weight A and the weight B is obtained and used as the content of the foaming agent gas in the foamable molten resin injected into the mold cavity. With respect to the amount of the foaming agent gas which leaks during the injection molding, it depends on the molding method. However, in an especially preferred embodiment of the method of the present invention, wherein the counter pressure method is used, carbon dioxide is used as both the foaming agent and the pressurized gas for applying a pressure to the mold cavity, there is almost no discrepancy even if the amount of the foaming agent gas (namely the amount of carbon dioxide gas) contained in the foamed molded article immediately after the molding, is used as the content of the foaming agent gas (namely the content of carbon dioxide gas) in the foamable molten resin.

The foaming agent gas, especially carbon dioxide gas, exhibits a high solubility in a thermoplastic resin, so that carbon dioxide gas dissolved in the thermoplastic resin not only functions as a good plasticizer which enhances the melt fluidity of the thermoplastic resin, but also functions as a foaming agent. The foamable molten resin used in the method of the present invention comprises a molten resin and, dissolved therein, at least one gaseous foaming agent. In the present invention, the content of the gaseous foaming agent in the foamable molten resin is preferably in the range of from 0.05 to 10% by weight. When the content of the gaseous foaming agent is 0.05% by weight or more, the fluidity of the foamable molten resin can be remarkably increased, and also good foaming of the foamable molten resin can be obtained. The content of the gaseous foaming agent is more preferably 0.2% by weight or more, still more preferably 0.5% by weight or more. The maximum content of the gaseous foaming agent in the foamable molten resin is preferably about 10% by weight. This is because, for dissolving a large amount of gaseous foaming agent (especially carbon dioxide gas) into a molten resin, equipments employable are greatly limited; and because, when a counter pressure method is used, it becomes necessary to use an extremely high pressure of the counter gas (i.e., it becomes necessary to apply an extremely high pressure to the mold cavity with a pressurized gas, prior to the injection of the foamable molten resin). It is more preferred that the content of the gaseous foaming agent in the foamable molten resin is 7% by weight or less, more advantageously 5% by weight or less. For the purpose of raising the expansion ratio of the foamed molded article, it is preferred to increase the amount of the gaseous foaming agent (e.g. carbon dioxide) dissolved in the foamable molten resin so as to lower the melt viscosity of the foamable molten resin and increase the foamability of the foamable molten resin.

Preferred methods for dissolving a foaming agent gas (i.e., gaseous foaming agent) into the thermoplastic resin include the following method 1 and method 2, which are exemplified in a case wherein carbon dioxide gas is used as the foaming agent gas.

In method 1, the thermoplastic resin in a particulate or powder form is placed in a carbon dioxide gas atmosphere, to thereby cause the resin to absorb carbon dioxide gas, prior to feeding the resin to an injection molding machine. In this method, the amount of carbon dioxide gas absorbed by the thermoplastic resin varies depending on the pressure of the carbon dioxide gas, the ambient temperature, and the absorption time. For example, when the thermoplastic resin is caused to absorb carbon dioxide gas under a pressure of carbon dioxide gas in the range of from 2 to 10 MPa at room temperature for 3 to 8 hours, the content of the resultant carbon dioxide gas in the thermoplastic resin is in the range of from 0.1 to 10% by weight. In this method, during the plasticization of the thermoplastic resin which is effected while heating, a part of the carbon dioxide gas contained in the resin is evaporated from the resin, so that the amount of the carbon dioxide gas contained in the resin becomes smaller than the amount of the carbon dioxide gas absorbed by the resin before the plasticization. Therefore, it is preferred that the atmosphere of paths for feeding the resin (e.g., the hopper of the molding machine) is a carbon dioxide gas atmosphere.

In method 2, carbon dioxide gas is dissolved in the thermoplastic resin in the cylinder of the molding machine during or after the plasticization. When method 2 is employed, generally, the hopper of the molding machine and portions of the molding machine around the hopper are in a carbon dioxide gas atmosphere, and/or carbon dioxide gas is introduced into the molding machine at a portion thereof corresponding to the middle or front end portion of the screw or cylinder of the molding machine. In the case where carbon dioxide gas is introduced into the molding machine at a portion thereof corresponding to the middle portion of the screw or cylinder of the molding machine, it is preferred that, at around a portion of the molding machine where carbon dioxide gas is introduced, the depth of the groove of the screw is large so as to lower the pressure of the resin in the cylinder. Further, for uniformly dissolving and dispersing the introduced carbon dioxide gas in the resin, it is preferred that the screw is provided with a mixing device, such as a dulmage or a kneading pin; and/or that a conduit for introducing the resin into the molding machine is equipped with a static mixer. As the injection molding machine, either an in-line screw type injection molding machine or a screw preplasticating type injection molding machine (i.e., a screw preplasticator ram injection molding machine) can be used. However, the use of a screw preplasticating type injection molding machine is especially preferred, because it is easy to alter not only the design of the screw at an extrusion region of the molding machine at which the resin is plasticized, but also the position at which carbon dioxide gas is introduced into the molding machine.

After the foam-injection molding, the carbon dioxide gas contained in the thermoplastic resin gradually diffuses into the air when the obtained foamed molded article is allowed to stand in the air.

In the method of the present invention, from the viewpoint of obtaining an excellent appearance of the foamed molded article, it is preferred that, before step (2) (i.e., injection of the foamable molten resin) and after step (1), a pressurized gas is introduced to the mold cavity so that the mold cavity is caused to have a pressure such that, in step (2), foaming of the foamable molten resin injected into the mold cavity does not occur at a flow front thereof (this means that the injection molding is effected according to the counter pressure method). In this preferred mode, with respect to the expression "a pressure such that, in step (2), foaming of the foamable molten resin injected into the mold cavity does not occur at a flow front thereof", such pressure (i.e., the pressure of the counter gas introduced to the mold cavity) varies depending on the foaming pressure exerted by the foamable molten resin; however, the pressure is generally in the range of from 3 to 10 MPa, preferably from 5 to 8 MPa. The mold cavity which has been pressurized by a pressurized gas is preferred to have an internal pressure at a level such that no foam mark is observed at the surface of the obtained foamed molded article. Further, from the viewpoint of not only minimizing the amount of the pressurized gas used per cycle of molding, but also rendering easy the sealing of the mold cavity and simplifying the structure of a gas feeding apparatus used, it is preferred that the mold cavity which has been pressurized by the gas introduced thereto has a lowest internal pressure such that no foaming occurs at a flow front of the foamable molten resin in the mold cavity.

With respect to the type of gas introduced to the mold cavity in the counter pressure method, various gases inert to the foamable molten resin can be used individually or in combination. Examples of such gases include air, carbon dioxide gas, nitrogen gas and the like. However, preferred is a gas which has a high solubility in the thermoplastic resin, such as carbon dioxide gas, nitrogen gas, a saturated hydrocarbon having 1 to 5 carbon atoms, and a fluoroalkane obtained by partially replacing the hydrogen atoms of a saturated hydrocarbon having 1 to 5 carbon atoms by fluorine. Examples of fluoroalkanes include flon gases (i.e., chlorofluorocarbon gases). Among these, the use of carbon dioxide gas is especially preferred, since carbon dioxide gas greatly improves the transferability of the surface morphology of the inner wall of the mold cavity to the foamed molded article. With respect to such transferability, in the case where an amorphous resin is used as the foamable molten resin and the mold cavity is pressurized by carbon dioxide gas before the foamable molten resin is injected into the mold cavity, the higher the internal pressure of the mold cavity, the higher the transferability, as described by the present inventors in Unexamined Japanese Patent Application Specification Laid-Open No. Hei 10-128783 (corresponding to EP826477A2) and Unexamined Japanese Patent Application Specification Laid-Open No. Hei 11-245256. Therefore, when it is desired to achieve a high transferability, it is preferred to increase the pressure of the mold cavity to a level as high as possible, taking into consideration the mold clamping force of the molding machine and the sealing property of the mold. It is preferred that the pressurized gas introduced in the mold cavity has a high carbon dioxide content, especially, a carbon dioxide content of 80% by volume or more.

In the method of the present invention, after a foamable molten resin is injected into the mold cavity which is pressurized with a gas, the foamable molten resin is pressed against the inner wall of the mold cavity by applying a high pressure such that foaming of the molten resin does not occur, and the pressure is maintained until the morphology of the inner wall of the mold cavity is reproduced on the surface of the foamable molten resin mass and until a portion of the foamable molten resin surface is cooled to be solidified to thereby form a non-foamed surface skin layer. The pressurized gas (counter gas) which was introduced to the mold cavity before the foamable molten resin is injected thereto, is released at an appropriate time which is during the injection of the foamable molten resin, and/or during the time after completion of the injection of the foamable molten resin and before completion of the pressurization of the injected foamable molten resin, wherein the appropriate time is selected taking into consideration whether or not a swirl mark occurs on the surface of the molded article and whether or not the surface of the molded article exhibits a good reproduction of the morphology of the inner wall of the mold cavity. When the pressurized gas (counter gas) remains in the mold cavity until after completion of the pressurization of the molten resin, problems possibly arise in that the surface of the molten resin is inadvertently pressed by the residual pressurized gas, resulting in the occurrence of a dent in the surface of the obtained molded article and that the residual pressurized gas causes foaming of the surface of the molten resin, resulting in a whitish clouded surface of the obtained molded article.

In a preferred embodiment of the method of the present invention, by employing the counter pressure method, a foamed molded article which exhibits no swirl mark on the surface thereof can be produced. However, in the production of an internal mechanical part, which is not required to have an excellent appearance, it is possible to perform the molding without employing the counter pressure method. When the molding is performed without employing the counter pressure method, a swirl mark occurs on the surface of the molded article. However, even in this case, when the application of a pressure to the foamable molten resin mass in step (3) is effected by injecting an additional amount of foamable molten resin into the mold cavity, thereby applying a predetermined resin holding pressure to the foamable molten resin mass, a lightweight molded article can be produced which has both a non-foamed surface skin layer and a highly foamed interior portion and which exhibits a high strength and a high dimensional accuracy.

As a further example of a case in which the use of the counter pressure method is not essential, there is a case wherein a method called "sandwich molding method" is employed to produce a foamed molded article. In this case, first, a non-foamable molten resin is injected into a mold cavity, and then a foamable molten resin is injected into the mold cavity so that the foamable molten resin is sandwiched between layers of non-foamable molten resin, to thereby form a molded article having a structure in which a foamed resin layer is sandwiched between non-foamed resin layers.

Examples of methods for applying a pressure to the foamable molten resin mass in step (3) of the method of the present invention include a method in which the application of a pressure to the foamable molten resin mass is effected by injecting an additional amount of foamable molten resin into the mold cavity, thereby applying a predetermined resin holding pressure to the foamble molten resin mass; a method in which a pressurized fluid, such as a gas, is introduced into the foamable molten resin mass in the mold cavity; and a method called "injection compression molding method", i.e., a method in which, after the injection of the molten resin, the volume of the mold cavity is reduced to compress the molten resin mass. The pressure applied to the foamable molten resin mass is set at a predetermined level such that the surface of the foamable molten resin mass is pressed against the inner wall of the mold cavity to thereby allow a surface portion of the foamable molten resin mass to be solidified to form a surface skin layer having a good reproduction (i.e., a good transfer) of the morphology of the inner wall of the mold cavity. Especially, in the case where carbon dioxide gas is used as the pressurized gas to pressurize the mold cavity, the higher the internal pressure of the mold cavity, the higher the transferability (reproduction of the morphology of the cavity inner wall). The pressure used to apply a pressure to the foamable molten resin mass is generally chosen in the range of from a few MPa to 200 MPa, in accordance with the fluidity of the foamable molten resin. With respect to the time for applying a pressure to the foamable molten resin mass, it is preferred that the pressurization is effected for a minimum time in which the surface portion of the foamable molten resin mass is solidified. When the foamable molten resin mass is pressurized for too long a time, the thickness of the surface skin layer becomes too large and hence the amount of the foamable molten resin mass becomes too small, and/or the resin temperature is lowered and thus the viscosity of the foamable molten resin becomes high, leading to a difficulty in obtaining a satisfactory foaming. The time for applying a pressure to the foamable molten resin mass is generally in the range of from 0.1 to 2.0 seconds.

As described in Unexamined Japanese Patent Application Specification Laid-Open No. Hei 11-245256, in the case where the molten resin is injected into the mold cavity which is pressurized by carbon dioxide gas, in connection with the cooling of the molten resin effected in the mold cavity, it is preferred that the mold temperature is equal to or higher than the temperature which is 35° C. lower than the actual solidification temperature of the molten resin (wherein the actual solidification temperature has been lowered by the carbon dioxide gas dissolved into the molten resin during the injection of the resin into the mold cavity), and also the mold temperature is equal to or lower than the temperature which is 5° C. lower than the solidification temperature intrinsic to the thermoplastic resin. Such mold temperature is preferred because the obtained molded article exhibits an excellent reproduction (i.e., excellent transfer) of the morphology of the inner wall of the mold cavity.

When the pressurization of the foamable molten resin mass is effected by introducing thereinto a pressurized fluid, such as a pressurized gas, the gas used to form a gas-filled hollow in the foamable molten resin mass may be the same as the foaming agent gas (i.e., a gaseous foaming agent) contained in the molten resin, or the same as the pressurized gas for the preliminary pressurization of the mold cavity. The hollow-forming gas, the gaseous foaming agent and the pressurized gas for mold cavity pressurization may be the same, but it is not necessary that they are the same, and two or three different gases may be used in combination. As the pressurized gas used to form a hollow in the molten resin, carbon dioxide gas is especially preferred, since carbon dioxide gas not only has the high effect of lowering the glass transition temperature (Tg) and solidification temperature of a molten resin, but also exhibits a high solubility in the molten resin.

In the method of the present invention, after a foamable molten resin is injected into the mold cavity in a full-shot amount, a portion of the foamable molten resin mass is released under the foaming pressure exerted by the foamable molten resin mass to the outside of the mold cavity (e.g., into the molten resin release cavity 3), thereby lowering the pressure exerted on the foamable molten resin mass, so that foaming of the foamable molten resin mass in the mold cavity is caused to occur to form a foamed resin mass. The method of the present invention can be especially advantageously used to produce two or more foamed molded articles at a time by using a single mold, or to produce two or more foamed molded articles having varied volumes, at a time by using a single mold, since the expansion ratios of the molded articles produced at a time can be easily controlled so as to be even. Thus, a plurality of foamed molded articles can be easily produced at a time by using a single mold.

Hereinbelow, the present invention is described in more detail, with reference to the accompanying drawings.

FIG. 1(a) to FIG. 1(c) are diagrammatic views showing the first embodiment of method of the present invention, wherein the obtained foamed molded article is in the form of a large-thickness rod.

In each of FIG. 1(a) to FIG. 1(c), reference numeral 1 indicates a mold comprising a fixed mold half 1a and a movable mold half 1b, wherein a mold cavity 2 and a molten resin release cavity 3 are formed by the inner wall of the fixed mold half 1a and the inner wall of the movable mold half 1b. The mold cavity 2 is a hollow portion of the mold 1, in which a foamable molten resin mass is molded to form a foamed molded article. On the other hand, the molten resin release cavity 3, which is positioned outside of the mold cavity 2, is another hollow portion of the mold 1 and communicates with the mold cavity 2 through the communication passage 5 which can be opened and closed by means of the openable/closable valve 4 (which is one form of the molten resin releasing means). The molten resin release cavity 3 is not intended for molding a molten resin to form a molded article. With respect to the openable/closable valve 4, a valve which is operated by oil hydraulic pressure, air pressure, magnetism, a motor or the like, can be used. Reference numerals 12 and 13 in FIG. 1(a), FIG. 2(a) and FIG. 3(a) to FIG. 3(d) respectively indicate an injection nozzle and a pressurized gas nozzle incorporated in the injection nozzle 12. The molten resin release cavity 3 has a gas passage 14 which is used as a counter gas inlet and outlet, and the gas passage 14 is connected, through a pipe, to a three-way valve 16 for feeding a counter gas. A gas inlet 18 (shown in FIG. 1(a)) is provided for the purpose of enabling direct introduction of a pressurized gas into the foamable molten resin mass in the mold cavity 2.

First, as illustrated in FIG. 1(a) and FIG. 1(b), the mold 1 is provided in a state in which the openable/closable valve 4 is closed, and the foamable molten resin 8 is injected into the mold cavity 2 through the injection nozzle 12, to thereby form a foamable molten resin mass in the mold cavity 2. In the injection, the foamable molten resin 8 flows through the sprue 6 and the runner 7, to be finally injected into the mold cavity 2. In this embodiment of the present invention, before injecting the foamable molten resin 8, the mold cavity 2 is preliminarily pressurized by feeding thereto a gas through the counter gas inlet 14. Thereafter, the foamable molten resin 8, which comprises a molten thermoplastic resin and, dissolved therein, a gaseous foaming agent (e.g., carbon dioxide gas), is injected into the mold cavity 2 through the injection nozzle 12. The mold cavity filling ratio of the foamable molten resin 8 is in the range of from 95 to 110%.

Then, immediately before or after completion of the injection of the resin, the three-way valve 16 for feeding a counter gas, which is connected to the gas passage 14 of the molten resin release cavity 3, is opened, thereby rapidly releasing the pressurized gas from the mold cavity 2 into the air. When closed, the openable/closable valve 4 does not allow the passage of the molten resin therethrough, but is not airtight even when it is closed. Therefore, even when closed, the openable/closable valve 4 allows the passage of a gas therethrough. When the counter gas in the mold cavity 2 is not released, the counter gas pressure is increased as the molten resin is injected into the mold cavity, leading to a problem in that, for example, incomplete filling with the resin occurs at the periphery of the mold cavity 2, and a problem in that the obtained molded article has surface defects, such as a whitish clouded surface, which is caused when foaming occurs at the surface of the resin due to absorption of a large amount of a counter gas.

Then, an additional amount of foamable molten resin is injected into the mold cavity, thereby applying a predetermined resin holding pressure to the foamable molten resin mass, and the pressure is maintained for a predetermined period of time, so that the surface of the foamable molten resin mass 8 which is in contact with the cavity inner wall of the mold cavity, is cooled and solidified to thereby form a substantially non-foamed surface skin layer 10. When this cooling time is increased, the thickness of the surface skin layer 10 is increased.

Further, as illustrated in FIG. 1(c), by opening the openable/closable valve 4 in the communication passage 5 which connects the mold cavity 2 to the molten resin release cavity 3, a portion of the foamable molten resin mass (as well as the foaming agent gas evaporated from the foamable molten resin) is released, under the foaming pressure exerted by the foamable molten resin mass 8 enclosed by the surface skin layer 10, to the molten resin release cavity 3 through the communication passage 5, thereby reducing the volume of the foamable molten resin mass 8 in the mold cavity 2 and hence lowering the pressure exerted on the foamable molten resin mass 8, so that foaming of the foamable molten resin mass 8 is caused to occur to form a foamed resin mass 9 having a surface skin layer 10.

When the foamed resin mass 9 is formed, a portion of the foamable molten resin mass 8 breaks through a part of the surface skin layer 10 and is released to the molten resin release cavity 3. Therefore, it is preferred that the surface skin layer 10 has a thickness which does not prevent the surface skin layer 10 from being broken through by a portion of the foamable molten resin mass 8. From this viewpoint, it is generally preferred that the surface skin layer 10 has a thickness in the range of from 0.1 to 1.0 mm.

For efficiently breaking a part of the surface skin layer 10, it is preferred that, after the openable/closable valve 4 is opened, an additional amount of the foamable molten resin is injected into the mold cavity 2, to thereby apply a pressure to the foamable molten resin mass 8 in the mold cavity 2. It is also preferred that the molten resin release cavity 3 has a volume larger than the volume of the portion of the foamable molten resin mass which is released under the foaming pressure exerted by the foamable molten resin mass 8 to the outside of the mold cavity 2 (and into the molten resin release cavity 3). This is because it is desired that the molten resin release cavity 3 is not completely filled by the portion of the foamable molten resin mass which is released into the molten resin release cavity 3 from the mold cavity 2. It is preferred that the molten resin release cavity 3 has a volume as large as possible.

As described above, by employing operation conditions such that the foamable molten resin does not completely fill the molten resin release cavity 3 and that the molten resin release cavity 3 is provided with the gas passage 14, there can be prevented problems that the counter gas, the air and the foaming agent gas in the mold cavity are not released in an instant and that the depressurization of the mold cavity after the resin injection takes too long a time, making it impossible to achieve a satisfactory foaming and hence to obtain a lightweight, foamed molded article.

FIG. 2(a) to FIG. 2(c) are diagrammatic views showing the second embodiment of method of the present invention, wherein the obtained foamed molded article is in the form of a large-thickness rod.

In the embodiment of the present invention as illustrated in FIG. 2(a) to FIG. 2(c), the foamable molten resin 8 is injected into the mold cavity 2 so that 70% of the volume of the mold cavity 2 is occupied by the foamable molten resin 8, and then a pressurized gas is introduced into the foamable molten resin mass 8 wherein the pressurized gas has a pressure which can prevent foaming of the foamable molten resin mass, to thereby form a gas-filled hollow 11 filled with the pressurized gas. In this embodiment of the present invention, the pressurized gas is supplied through the pressurized gas nozzle 13 which is incorporated in the injection nozzle 12, and (as in the case of the foamable molten resin 8 injected into the mold cavity,) the supplied pressurized gas flows through the sprue 6 and the runner 7, to be finally introduced into the foamable molten resin mass 8 in the mold cavity 2. With respect to the inlet for the pressurized gas, instead of the above-mentioned pressurized gas nozzle 13, a gas inlet 18 as illustrated in FIG. 1(a) may be used. In FIG. 1(a), the gas inlet 18 which opens in the mold cavity 2 is provided at a position close to the gate of the mold cavity 2.

As mentioned above, the mold cavity 2 is filled with the foamable molten resin 8 having a gas-filled hollow 11 which is filled with a pressurized gas, and the gas pressure in the gas-filled hollow 11 is maintained for a predetermined period of time, thereby exerting a pressure on the foamable molten resin mass to press the outer surface of the foamable molten resin mass against the inner wall of the mold cavity, to thereby form the surface skin layer 10. Then, while keeping, closed or opened, the valve (not shown) used for controlling the introduction of the pressurized gas, the openable/closable valve 4 is opened. Consequently, the surface skin layer 10, which surrounds the gas-filled hollow 11, is broken at its portion near the communication passage 5 by the pressure difference between the gas-filled hollow 11 and the molten resin release cavity 3, and a small broken piece of the surface skin layer 10 is blown off into the molten resin release cavity 3 and simultaneously the pressurized gas in the hollow 11 spurts out and flows through the molten resin release cavity 3, to be quickly released through the gas passage 14 to the outside of the mold. As a result, the internal pressure of the hollow 11 is rapidly lowered, that is, the gas pressure which prevents foaming of the foamable molten resin 8 is no longer present, so that foaming of the foamable molten resin 8 is caused to occur at the inner periphery of the hollow 11, and also, a portion of the foamable molten resin mass and the foaming agent gas evaporated from the foamable molten resin are released to the molten resin release cavity 3. Thus, a foamed resin mass 9 having the surface skin layer 10 is obtained, as illustrated in FIG. 2(c). Such a rapid depressurization of the hollow 11 can be effected not only in the above-mentioned manner, in which the openable/closable valve 4 in the communication passage 5 connected to the molten resin release cavity 3 is used, but also in other manners, for example, in the following manner. A hollow pin (not shown) similar to a syringe needle is provided in the mold 1 so that the tip of the pin can be slid into and out of the mold cavity 2. After the foamable molten resin mass having a gas-filled hollow 11 is formed in the mold cavity 2, the foamable molten resin mass is pricked with the above-mentioned pin, thereby allowing the pressurized gas in the hollow 11 to be released to the outside of the mold 1 through the hollow of the pin. It is preferred that the molten resin release cavity 3 has a volume such that the molten resin release cavity 3 is not completely filled by the portion of the foamable molten resin mass which is released thereinto under the gas pressure of the hollow 11 and under the foaming pressure exerted by the foamable molten resin mass. It is also preferred that the pressurized gas can be released in an instant from the molten resin release cavity 3 to the outside of the mold. The mold cavity filling ratio of the foamable molten resin 8 can be appropriately selected in the range of from 55 to 110%.

By employing operation conditions such that the foamable molten resin does not completely fill the molten resin release cavity 3 and that the molten resin release cavity 3 is provided with the gas passage 14, there can be prevented problems in that the pressurized gas used to form the gas-filled hollow 11 is not completely released and that the depressurization of the mold cavity after the resin injection takes too long a time, making it impossible to achieve a satisfactory foaming and hence to obtain a lightweight, foamed molded article.

As mentioned above, it is preferred that the pressurized gas used to form the gas-filled hollow 11 is carbon dioxide gas. The use of carbon dioxide gas is advantageous in that, even when the pressurized gas is maintained in the foamable molten resin mass in the mold cavity for a prolonged period of time, the foamable molten resin mass can further absorb carbon dioxide gas through the inner surface of the foamable molten resin mass, which is in contact with the gas-filled hollow 11, thereby lowering the solidification rate of the foamable molten resin and hence enabling good foaming.

The use of carbon dioxide gas to form the gas-filled hollow 11 is also advantageous when the following operation is performed. In using carbon dioxide gas as a hollow-forming gas for the hollow 11, the hollow-forming gas is continuously fed even after the openable/closable valve 4 is opened, while releasing the hollow-forming gas to the outside of the mold through the molten resin release cavity 3 and the gas passage 14. By performing this operation, the interior portion of the foamed molded article is cooled by the effect of the adiabatic expansion of carbon dioxide gas. Thus, the above-mentioned operation makes it possible to set a short cooling time for solidification of the foamed molded article after step (4) of the method of the present invention. Alternatively, instead of achieving a short cooling time, the above-mentioned operation makes it possible that a foamed molded article obtained in the mold cavity can be taken out from the mold cavity even when the molding has been performed under conditions wherein the mold temperature is very high, specifically under conditions wherein the mold temperature is equal to or higher than the glass transition temperature (Tg) of the thermoplastic resin in the case where the resin is an amorphous thermoplastic resin, or under conditions wherein the mold temperature is close to the melting temperature of the thermoplastic resin in the case where the resin is a crystalline thermoplastic resin. In addition, the obtained foamed molded article taken out from the mold cavity has an extremely excellent appearance.

After the foaming is completed, the foamed resin mass having a substantially non-foamed surface skin layer in the mold cavity 2 is cooled until the resin mass is ready to be taken out from the mold cavity. Then, the mold 1 is opened and the foamed molded article is taken out therefrom. The obtained foamed molded article has a non-foamed surface skin layer 10 and a foamed interior portion 9. The non-foamed surface skin layer 10 was formed by an operation in which, prior to the above-mentioned foaming, the surface of the molten resin mass is cooled to a temperature at which no foaming occurs. The foamed interior portion 9 was formed by the above-mentioned foaming.

In either of the first embodiment of method and the second embodiment of method of the present invention, it is preferred that the mold cavity is preliminarily pressurized with a gas (i.e., the counter pressure method), from the viewpoint of preventing possible occurrence of defects (such as a silver streak, a silver blister or the like) on the surface skin layer of a foamed molded article.

When the counter pressure method is employed, from the viewpoint of easily achieving a desired level of counter gas pressure, it is preferred that the mold has a mold cavity which is sealed. For example, the mold cavity 1 as shown in FIG. 1(*a*) to FIG. 3(*d*) has O-rings (indicated by reference numerals 15*a* to 15*c*) which are used for sealing each gap left around the mold cavity 2 of the mold 1. Therefore, the presence of the O-rings facilitates the above-mentioned embodiment of the first method of the present invention, in which, first, the mold cavity 2 is filled with a counter gas fed thereto through the counter gas inlet 14, and then a foamable molten resin is injected into the mold cavity 2, so that foaming of the molten resin during the injection can be easily prevented. When the counter gas inlet 14 is a slit, a small hole or a porous body each of which does not allow passage of a molten resin, the counter gas inlet 14 can be positioned so as to open directly in the mold cavity 2.

FIG. 3(*a*) to FIG. 3(*d*) are diagrammatic views showing another mode of the second embodiment of method of the present invention, wherein the obtained molded article comprises a small-thickness portion (having a large area) which is connected, at one side thereof, to a large-thickness portion. The mold 1 is provided in a state in which the openable/closable valve 4 is closed, and the foamable molten resin 8 is injected into the mold cavity 2 through the injection nozzle 12, to thereby form a foamable molten resin mass in the mold cavity 2. In the injection, the foamable molten resin 8 flows through the sprue 6 and the runner 7, to be finally injected into the mold cavity 2, which comprises a region for forming a large-thickness portion and a region for forming a small-thickness portion.

In the method of the present invention, since the melt viscosity of the foamable molten resin 8 is lowered due to the presence of a foaming agent gas (i.e., gaseous foaming agent) dissolved therein, such as carbon dioxide gas, the foamable molten resin 8 can rapidly flow into and fill the region of the mold cavity for forming the small-thickness portion of the molded article. When the mold cavity 2 is preliminarily pressurized with a pressurized gas, the three-way valve (not shown) for feeding a counter gas, which is connected to the gas passage 14 of the molten resin release cavity 3, is opened immediately before or after completion of the injection of the foamable molten resin, to thereby rapidly release the pressurized gas from the mold cavity 2 into the air.

In the above-mentioned mode of the present invention, the mold cavity filling ratio of the foamable molten resin is preferably in the range of from 95 to 110%, more preferably from 98 to 105%.

After completion of the injection of the foamable molten resin 8 into the mold cavity 2, a pressurized gas is introduced into the foamable molten resin 8 wherein the pressurized gas has a pressure which can prevent foaming of the foamable molten resin, to thereby form the gas-filled hollow 11 which is filled with the pressurized gas. In this embodiment of the present invention, the pressurized gas is supplied through the pressurized gas nozzle 13 which is incorporated in the injection nozzle 12, and (as in the case of the foamable molten resin 8 injected into the mold cavity,) the supplied pressurized gas flows through the sprue 6 and the runner 7, to be finally introduced into the foamable molten resin mass 8 in the mold cavity 2. This introduction of the pressurized gas is effected for the purpose of compensating for the volume decrease due to the cooling shrinkage of the foamable molten resin mass 8, and especially in cases like this embodiment of the present invention which is to produce a molded article having a large-thickness portion, the pressurized gas is introduced mainly into the region for forming a large-thickness portion, as illustrated in FIG. 3(*c*). In the mold cavity 2, the region of the cavity for forming the large-thickness portion extends from near the resin gate to a peripheral region of the cavity corresponding to the flow front of the foamable molten resin, and is connected to the communication passage 5 which is connected to the molten resin release cavity 3.

With respect to the inlet for the pressurized gas, instead of the above-mentioned pressurized gas nozzle 13, the pressurized gas inlet may be positioned in the mold 1 so as to directly open in or around the region of the mold cavity for forming the large-thickness portion. In this case, it is preferred that the pressurized gas inlet is positioned opposite to the communication passage 5 connected to the molten resin release cavity 3. It is also preferred that the large-thickness portion of the molded article has a thickness which is 1.5 to 4.0 times the thickness of the small-thickness portion of the molded article, so that when the molten resin is injected into the mold cavity, the flow front of the molten resin flows preferably through the region of the mold cavity for forming the large-thickness portion.

As described above, the mold cavity 2 is filled with the foamable molten resin 8 having a gas-filled hollow 11 which is filled with a pressurized gas, and the gas pressure in the gas-filled hollow 11 is maintained for a predetermined period of time, thereby exerting a pressure on the foamable molten resin mass to press the outer surface of the foamable molten resin mass against the inner wall of the mold cavity, to thereby form the surface skin layer 10, followed by opening of the openable/closable valve 4. Consequently, the surface skin layer 10, which surrounds the gas-filled hollow 11, is broken at its portion near the communication passage 5 by the pressure difference between the gas-filled hollow 11 and the molten resin release cavity 3, and a small broken piece of the surface skin layer 10 is blown off into the molten resin release cavity 3. As a result, the internal pressure of the hollow 11 is rapidly lowered, that is, the gas pressure which prevents foaming of the foamable molten resin 8 is no longer present, so that foaming of the foamable molten resin 8 is caused to occur at the periphery of the hollow 11, and also, a portion of the foamable molten resin mass and the foaming agent gas evaporated from the foamable molten resin mass are released to the molten resin release cavity 3. Thus, a foamed molten resin mass 9 having the surface skin layer 10 is obtained, as illustrated in FIG. 3(*d*). With respect to the releasing of a portion of the foamable molten resin mass 8 into the molten resin release cavity 3 to thereby effect foaming of the foamable molten resin mass 8 in the mold cavity, the releasing can be performed without forming the gas-filled portion 11, that is, the releasing can be performed only by the use of the foaming pressure exerted by the foamable molten resin mass 8.

Figure 4:
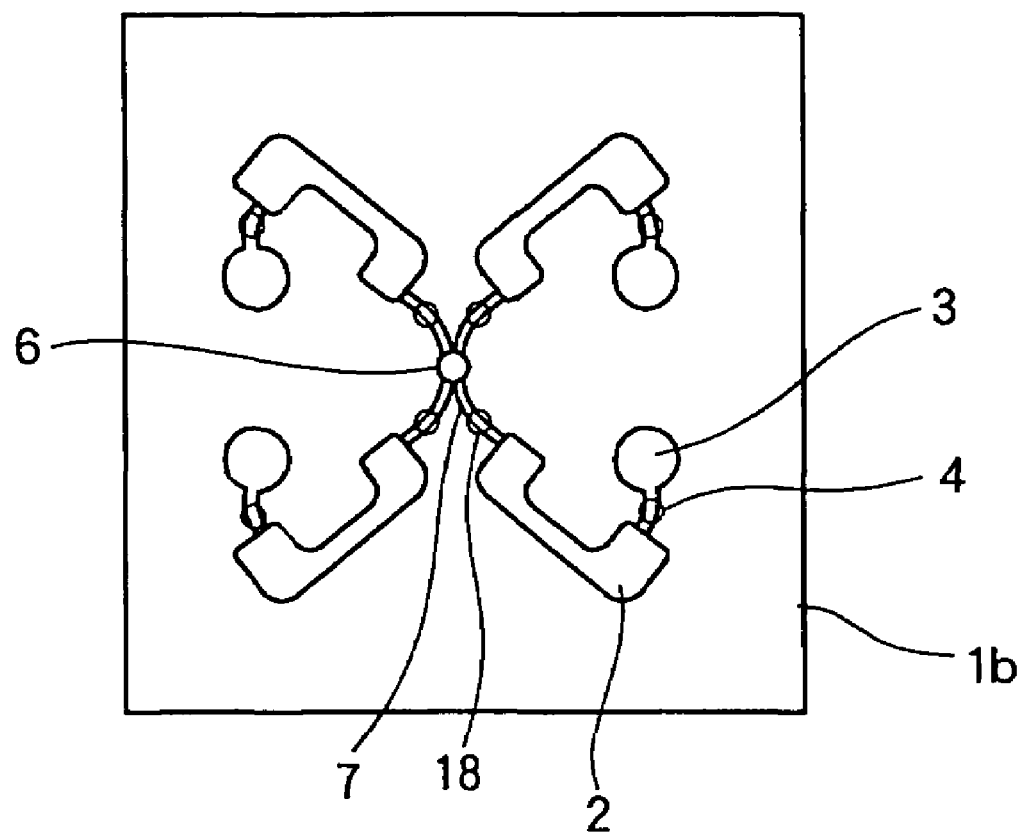
FIG. 4 is a diagrammatic front view of a movable mold half of one form of a mold which can be used in the method of the present invention wherein the mold is adapted for producing 4 molded articles at a time.

FIG. 4 is a diagrammatic front view of a movable mold half of one form of a mold which can be used in the method of the present invention, wherein the mold has a mold cavity design adapted for producing 4 molded articles, each in the form of a grip, simultaneously. As illustrated in FIG. 4, the mold has four cavities 2, and, for each cavity 2, there are provided a molten resin release cavity 3, an openable/closable valve 4, and a gas inlet 18 which is used to introduce a gas for forming a gas-filled hollow. Each gas inlet 18 can be controlled independently from the other inlets 18, so that the gas inlets 18 do not affect each other with respect to the gas pressure.

The mold 1 is provided in a state in which the openable/closable valve 4 is closed, and a foamable molten resin is injected into each mold cavity 2 through the injection nozzle 12. In the injection, the foamable molten resin 8 flows through the sprue 6 and the runner 7, and finally reaches each mold cavity 2.

When all the mold cavities 2 have the same volume, it is preferred that the runners and gates are designed so that all the mold cavities 2 receive the same amount of the foamable molten resin.

On the other hand, when the lengths of the runners are different as between the mold cavities 2 due to the arrangement of the mold cavities 2 in the mold, or when the volumes of the mold cavities 2 are different from each other, it is preferred to adjust the length and thickness of the runner, and the size of the gate, so that the injection of the foamable molten resin into all the mold cavities is completed simultaneously.

It is preferred that each gas inlet 18 is positioned near the gate of each mold cavity, and that the pipes connected respectively to the gas inlets 18 have the same length, so that the gas pressure losses in the pipes become even.

The molding operation is more specifically described below. First, the foamable molten resin 8 is injected into each mold cavity 2 through the injection nozzle 12, to thereby form a foamable molten resin mass in the mold cavity. Then, a pressure is applied to the foamable molten resin mass for a predetermined period of time to press the surface of the foamable molten resin mass against the inner wall of the mold cavity, to thereby form the surface skin layer 10. Then, the openable/closable valve 4 is opened. As a result, a portion of the molten resin mass (which is enclosed by the surface skin layer 10) and the foaming agent gas evaporated from the foamable molten resin mass, under the foaming pressure exerted by the foamable molten resin mass, are released into the molten resin release cavity 3. Thus, a foamed resin mass 9 having the surface skin layer 10 is formed. The obtained molded articles are substantially the same in the appearance and the foamed interior portion, and this can be realized because, in the molding operation, each mold cavity is first completely filled with the foamable molten resin and then a portion of the foamable molten resin is released into the molten resin release cavity by using the foaming pressure exerted by the foamable molten resin.

In this embodiment of the present invention, when a gas-filled hollow is formed in the foamable molten resin mass by using a gas, the following operation is performed. After completion of the injection of the foamable molten resin into each mold cavity 2, a pressurized gas is introduced into the foamable molten resin mass to thereby form a hollow therein. Then, the gas supply is stopped and the openable/closable valve 4 is opened, to thereby release a portion of the foamable molten resin mass and the pressurized gas in the hollow to the molten resin release cavity 3, thereby causing foaming of the foamable molten resin mass to occur to form a foamed resin mass 9. In a case where the above-mentioned formation of the gas-filled hollow is effected when the foamable molten resin mass is in a short-shot amount, that is, the mold cavity filling ratio is relatively low, such as about 70%, extra care should be taken so that all the mold cavities have the same mold cavity filling ratio; this care is taken with respect to adjustment of production conditions, such as the length and thickness of the runner connected to each cavity, the size of the gate, the length of the gas introduction pipe and the like.

When there is a possibility of the occurrence of a problem that the foaming agent gas evaporated from the foamable molten resin causes the occurrence of defects (such as a silver streak, a silver blister or the like) on the surface skin layer of a foamed molded article, the use of the counter pressure method is preferred in the method of the present invention.

Best Mode For Carrying Out The Invention

Hereinbelow, the present invention will be described in more detail with reference to the following Examples and Comparative Examples.

Molding was conducted by using an injection molding machine as illustrated in FIG. 5. As the injection molding machine 23 illustrated in FIG. 5, the injection molding machine "SG260M-S" (manufactured and sold by Sumitomo Heavy Industries, Ltd., Japan) was used. The screw cylinder 20 of the injection molding machine is a vent type cylinder wherein L/D=29 and the vent portion can be pressurized with carbon dioxide gas. Carbon dioxide gas or nitrogen gas was supplied to the molten resin in the injection molding machine, from the source 24 of carbon dioxide gas or nitrogen gas via the gas supply control device 19 and the gas introduction line 21, and the amount of carbon dioxide gas or nitrogen gas which was dissolved into the molten resin was controlled by operating a pressure reducing valve so as to maintain, at a predetermined level, the pressure of carbon dioxide gas or nitrogen gas which was supplied from the source 24 of carbon dioxide gas or nitrogen gas. Further, the screw back-pressure was maintained at a minimum level such that foaming of the molten resin could be prevented to thereby prevent backward movement of the screw, during the period from the commencement of the plasticization to the commencement of the injection.

Carbon dioxide gas or nitrogen gas can be supplied to the mold 1 from the source 24 of carbon dioxide gas or nitrogen gas through the gas supply control device 19 and the counter gas introduction line 22 for the mold.

EXAMPLE 1

A rod-shaped molded article was produced according to the method as illustrated in FIG. 1(a) to FIG. 1(c), wherein the molded article has a length of 300 mm and has a cross-section having an almost square shape of a size of 20 mm×20 mm. The mold 1 has a rod-shaped mold cavity 2, wherein one end of the mold cavity 2 has a gate having a size of 5 mm×10 mm and the other end of the mold cavity 2 is connected to the communication passage 5 having a cross-section of a size of 5 mm×10 mm and having a length of 15 mm, wherein the communication passage 5 has at a middle portion thereof the openable/closable valve 4 which is operated by oil hydraulic pressure, and the communication passage 5 leads to the molten resin release cavity 3 which has a cross-section with a size of 20 mm×20 mm and has a length of 600 mm.

A polyamide 66 (Leona™ 1402G, manufactured and sold by Asahi Kasei Kabushiki Kaisha, Japan) containing 33% by weight of a glass fiber was charged into and melted in the injection cylinder of the injection molding machine, and carbon dioxide gas under a pressure of 8 MPa was supplied to and dissolved into the glass fiber-containing polyamide resin. Then, the resultant, glass fiber-containing foamable polyamide resin in a molten form (containing carbon dioxide gas) was subjected to injection molding as illustrated in FIG. 1(a) and FIG. 1(b). The cylinder temperature was 280° C., the injection pressure was 120 MPa, and the mold cavity filling ratio of the molten resin was 100%. The molding operation is more specifically described below. The injection nozzle 12 was pressed onto the top of the closed mold 1 (mold temperature: 80° C.), and carbon dioxide gas under a pressure of 7 MPa was supplied into the mold cavity 2 through the counter gas inlet 14 for 3 seconds. Then, the above-mentioned glass fiber-containing polyamide resin having carbon dioxide gas dissolved therein (namely a foamable molten resin) was injected into the mold cavity 2 with an injection time of 1.5 seconds. After completion of the injection of the foamable molten resin, the resultant foamable molten resin mass 8 in the mold cavity 2 was pressurized for 3 seconds by maintaining the resin pressure in the injection cylinder at 90 MPa, while releasing the counter gas pressure from the mold cavity 2 to the outside of the mold 1 through the molten resin release cavity 3 and the counter gas inlet 14 (gas passage). Then, the openable/closable valve 4 of the communication passage 5 was opened to release a portion of the foamable molten resin mass 8 under the foaming pressure exerted by itself to the molten resin release cavity 3 through the communication passage 5 (having the valve 4 opened), thereby lowering the pressure exerted on the foamable molten resin mass 8, so that foaming of the foamable molten resin mass 8 was caused to occur to form a foamed resin mass 9. After 60 seconds from the foaming, the mold 1 was opened and the obtained foamed molded article was taken out therefrom. Thus, a foamed molded article was obtained which had a substantially non-foamed surface skin layer 10 and a highly foamed interior portion.

The carbon dioxide gas content of the foamable molten resin was about 1.0% by weight, as measured from the weight loss which was exhibited by the obtained foamed molded article after it was taken out from the mold. The obtained foamed molded article exhibited an expansion ratio of 1.4, and its surface skin layer had a thickness of about 1.0 mm.

EXAMPLE 2

A foamed molded article was produced in substantially the same manner as in Example 1, except that the production conditions were modified as mentioned below. The mold cavity filling ratio of the molten resin was 70%. After completion of the injection of the foamable molten resin, carbon dioxide gas under a pressure of 8 MPa was introduced into the molten resin mass 8 through the pressurized gas nozzle 13 which was incorporated in the injection nozzle 12, thereby forming the gas-filled hollow 11, while releasing the counter gas pressure from the mold cavity 2 to the outside of the mold 1 through the molten resin release cavity 3 and the counter gas inlet 14 (gas passage). The introduction of carbon dioxide gas into the gas-filled hollow 11 of the molten resin mass 8 was continued for 3 seconds, thereby maintaining the gas pressure in the gas-filled hollow 11. Then, the introduction of carbon dioxide gas was stopped, and the openable/closable valve 4 in the communication passage 5 connected to the molten resin release cavity 3 was opened, to thereby release, in an instant, the carbon dioxide gas in the gas-filled hollow 11 of the molten resin mass 8 and a portion of the molten resin mass 8 to the molten resin release cavity 3, thereby lowering the pressure exerted on the foamable molten resin mass 8, so that foaming of the molten resin mass 8 in the mold cavity 2 was caused to occur to form a foamed resin mass 9 having a surface skin layer 10.

The carbon dioxide gas content of the foamable molten resin was about 1.0% by weight. The obtained foamed molded article exhibited an expansion ratio of 2.0, showing that the foamed molded article obtained in Example 2 has a lightweight property more excellent than the foamed molded article obtained in Example 1.

EXAMPLE 3

A foamed molded article was produced in substantially the same manner as in Example 1, except that the production conditions were modified as mentioned below.

The mold cavity 2 used in Example 3 had the same shape as in Example 1, but the mold cavity 2 had an inner wall with a grained surface of an average roughness (Ra) of 13.2 μm. The average roughness (Ra) was measured by using a surface roughness measuring instrument "Surfcom 570A" (manufactured and sold by Tokyo Seimitsu Co., Ltd., Japan). (With respect to the average roughness (Ra), reference can be made to "Kikai Kogaku Binran (Mechanical Engineering Handbook)", 6th revised edition (published by The Japan Society of Mechanical Engineers, 1977.)

A polystyrene resin (A & M Polystyrene™ 685, manufactured and sold by A & M Styrene Co., Ltd., Japan) was charged into and melted in the injection cylinder 20 of the injection molding machine, and carbon dioxide gas under a pressure of 10 MPa was supplied to and dissolved into the polystyrene resin. Then, the resultant, carbon dioxide gas-containing polystyrene resin in a molten form was injected into the mold cavity 2 in the same manner as in Example 1. The cylinder temperature was 220° C. and the injection pressure was 100 MPa. The molding operation is more specifically described below. The above-mentioned polystyrene (foamable molten resin) having carbon dioxide gas dissolved therein was injected (with an injection time of 1.5 seconds) into the mold cavity 2 (mold temperature: 50° C.) which was pressurized with carbon dioxide gas under a pressure of 7 MPa, and the resultant foamable molten resin mass 8 in the mold cavity 2 was pressurized for 3 seconds by maintaining the resin pressure in the injection cylinder at 80 MPa. Then, the openable/closable valve 4 of the communication passage 5 was opened to release a portion of the foamable molten resin mass 8 under the foaming pressure exerted by itself to the molten resin release cavity 3 through the communication passage 5 (having the valve 4 opened), thereby lowering the pressure exerted on the foamable molten resin 8, so that foaming of the foamable molten resin mass 8 was caused to occur to form a foamed resin mass 9. After 60 seconds from the foaming, the mold 1 was opened and the obtained foamed molded article was taken out therefrom.

The carbon dioxide gas content in the foamable molten resin was about 3.0% by weight. The obtained foamed molded article exhibited an expansion ratio of 2.6, and its surface skin layer had a thickness of 1.5 mm. Further, the surface of the obtained foamed molded article had an average roughness (Ra) of 13.1 μm, i.e., the surface of the foamed molded article exhibited an excellent reproduction of the grained surface of the inner wall of the mold cavity 2. Also, the foamed molded article exhibited no surface defects, such as uneven luster or a flow mark.

EXAMPLE 4

A foamed molded article was produced in substantially the same manner as in Example 1, except that the production conditions were modified as mentioned below. As the resin, a polycarbonate ("Panlight™ L1225", manufactured and sold by Teijin Chemicals Ltd., Japan) was used. The cylinder temperature was 300° C., the injection pressure was 220 MPa, the mold temperature was 80° C., the pressure of carbon dioxide gas supplied to the injection cylinder was 10 MPa, and the pressure of the counter gas supplied to the mold cavity 2 was 7 MPa. The polycarbonate having carbon dioxide gas dissolved therein was injected into the mold cavity 2 with an injection time of 2.0 seconds. Immediately after completion of the injection, the resultant foamable molten resin mass 8 in the mold cavity 2 was pressurized for 1 second by maintaining the resin pressure in the injection cylinder at 180 MPa, while releasing the counter gas pressure from the mold cavity 2 to the outside of the mold 1 through the molten resin release cavity 3 and the counter gas inlet 14 (gas passage). Then, the openable/closable valve 4 of the communication passage 5 was opened to release a portion of the foamable molten resin mass 8 under the foaming pressure exerted by itself to the molten resin release cavity 3 through the communication passage 5 (having the valve 4 opened), thereby lowering the pressure exerted on the foamable molten resin mass 8, so that foaming of the foamable molten resin mass was caused to occur to form a foamed resin mass 9. After 60 seconds from the foaming, the mold 1 was opened and the obtained foamed molded article was taken out therefrom. Thus, a foamed molded article was obtained which had a substantially non-foamed surface skin layer 10 and a highly foamed interior portion.

The carbon dioxide gas content of the foamable molten resin was about 2.0% by weight. The obtained foamed molded article exhibited an expansion ratio of 1.4, and its surface skin layer had a thickness of about 2.0 mm.

EXAMPLE 5

A foamed molded article was produced in substantially the same manner as in Example 1, except that the production conditions were modified as mentioned below. As the resin, a semiaromatic polyamide ("Leona™ 90G33", manufactured and sold by Asahi Kasei Kabushiki Kaisha, Japan) containing 33% by weight of a glass fiber was used, wherein the aromatic ring content of the polyamide was about 10% by weight, so that the crystallization rate of the polyamide was low. The cylinder temperature was 280° C., the injection pressure was 120 MPa, the mold temperature was 80° C., the pressure of carbon dioxide gas supplied to the injection cylinder was 2 MPa, and no counter gas was introduced into the mold cavity 2. The glass fiber-containing foamable semiaromatic polyamide resin in a molten form (containing carbon dioxide gas) was injected into the mold cavity 2 with an injection time of 2.0 seconds. Immediately after completion of the injection, the resultant foamable molten resin mass 8 in the mold cavity 2 was pressurized for 1 second by maintaining the resin pressure in the injection cylinder at 80 MPa. Then, the openable/closable valve 4 of the communication passage 5 was opened to release a portion of the foamable molten resin mass 8 under the foaming pressure exerted by itself to the molten resin release cavity 3 through the communication passage 5 (having the valve 4 opened), thereby lowering the pressure exerted on the foamable molten resin mass 8, so that foaming of the foamable molten resin mass was caused to occur to form a foamed resin mass 9. After 60 seconds from the foaming, the mold 1 was opened and the obtained foamed molded article was taken out therefrom. Thus, a foamed molded article was obtained which had a substantially non-foamed surface skin layer 10 and a highly foamed interior portion.

The carbon dioxide gas content of the foamable molten resin was about 0.1% by weight. The obtained foamed molded article exhibited an expansion ratio of 1.4, and its surface skin layer had a thickness of about 2.0 mm.

Since the crystallization rate of the resin was low and the foamable molten resin was injected in a full-shot amount, the obtained foamed molded article had no foam mark on the surface thereof and had an excellent appearance.

EXAMPLE 6

Figure 3A:
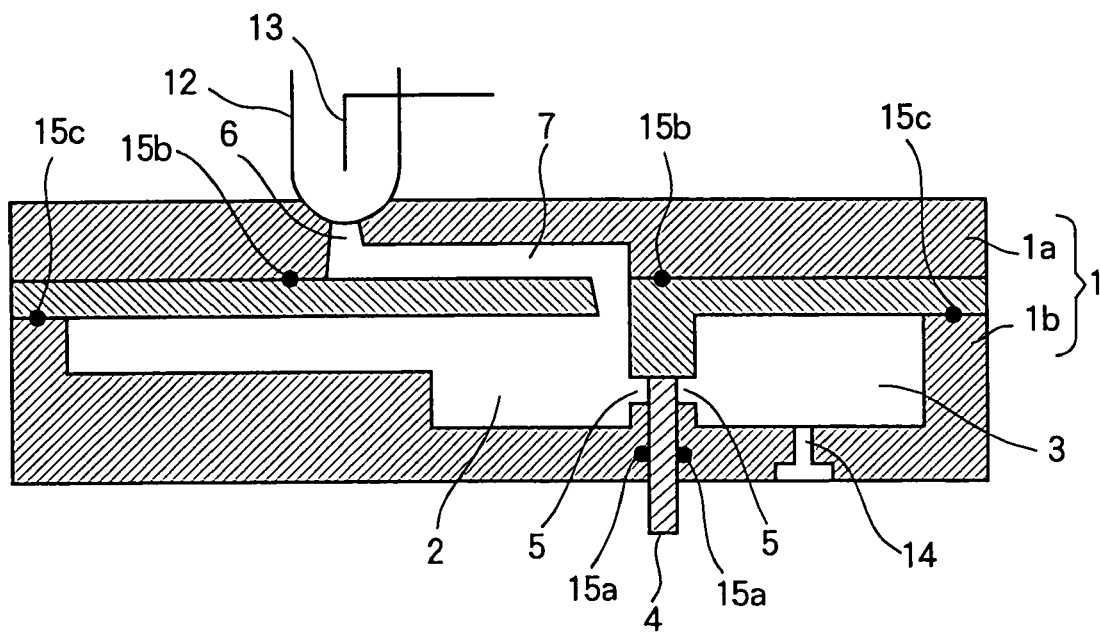
FIG. 3(a) to FIG. 3(d) are diagrammatic views showing the method of the present invention as used in Example 6.
Figure 3B:
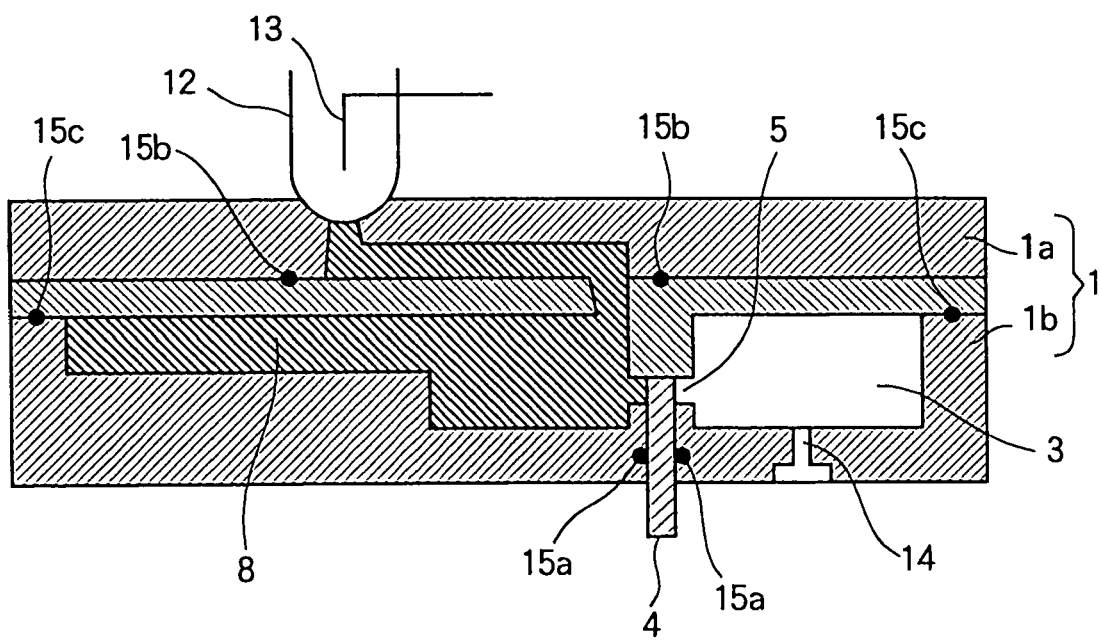
Figure 3C:
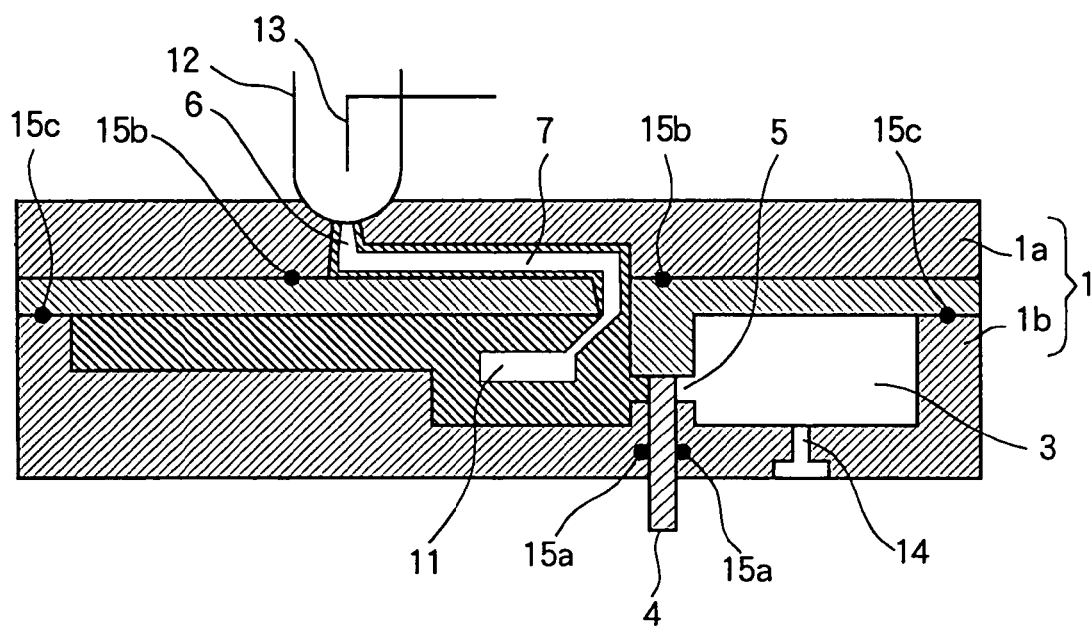
Figure 3D:
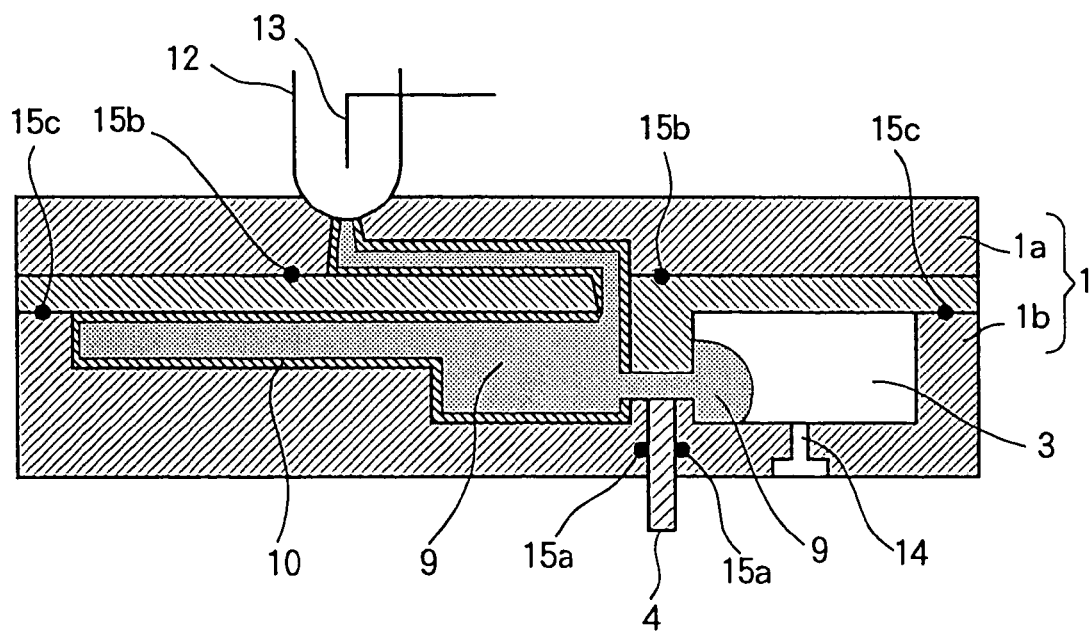

A foamed molded article was produced in substantially the same manner as in Example 2, except that the production conditions were modified as mentioned below. As illustrated in FIG. 3(a) to FIG. 3(c), the mold cavity 2 used in Example 6 had a design in which a flat plate (small-thickness portion) with a thickness of 2.5 mm is connected, at one side thereof, to a channel (large-thickness portion) having a cross-section of a size of 4 mm×4 mm (i.e., the mold cavity has a "thin-plate/channel" design). The mold cavity filling ratio of the molten resin was 98%. After completion of the injection of the foamable molten resin, carbon dioxide gas under a pressure of 8 MPa was introduced into the molten resin mass 8 through the pressurized gas nozzle 13 which was incorporated in the injection nozzle 12, thereby forming the gas-filled hollow 11, while releasing the counter gas pressure from the mold cavity 2 to the outside of the mold 1 through the molten resin release cavity 3 and the counter gas inlet 14 (gas passage). The introduction of carbon dioxide gas into the gas-filled hollow 11 of the molten resin mass 8 was continued for 2 seconds, thereby maintaining the gas pressure in the gas-filled hollow 11. Then, the introduction of carbon dioxide gas was stopped, and the openable/closable valve 4 in the communication passage 5 connected to the molten resin release cavity 3 was opened, to thereby release, in an instant, the carbon dioxide gas in the gas-filled hollow 11 of the molten resin mass 8 and a portion of the molten resin mass 8 to the molten resin release cavity 3, thereby lowering the pressure exerted on the molten resin mass 8, so that foaming of the molten resin mass 8 in the mold cavity 2 was caused to occur to form a foamed resin mass 9 having a surface skin layer 10.

The carbon dioxide gas content of the foamable molten resin was about 1.0% by weight. The obtained foamed molded article exhibited an expansion ratio of 1.2 and had a foamed interior portion not only in the large-thickness portion thereof but also in the small-thickness portion.

EXAMPLE 7

A foamed molded article was produced by using a mold (as shown in FIG. 4) having a mold cavity design adapted for producing 4 molded articles simultaneously, wherein each molded article to be obtained is in the form of a grip having a diameter of 22 mm and has both end arms positioned at a distance of 180 mm from each other. The runners 7 in the mold, each connected to each mold cavity 2, were designed to have almost the same length. Each mold cavity 2 was provided with and connected to a molten resin release cavity 3 through a communication passage which has an openable/closable valve 4. The operation timing of each openable/closable valve 4 was controllable independently from those of the other openable/closable valves 4. Each molten resin release cavity 3 had a volume of about 70 CC and had a diameter of 30 mm and a depth of 100 mm. Each communication passage connecting the mold cavity 2 to the molten resin release cavity 3 had a cross-section of a size of 5 mm×5 mm, and the outlet of the mold cavity 2, which is in direct contact with the communication passage, had a cross-section of a size of 5 mm×5 mm. Each gas inlet 18 (shown in FIG. 4) used for introducing the pressurized gas for forming the hollow 11 was located close to the resin gate of each mold cavity 2. With respect to the gas introduction timing, the pressure and the gas keeping time, each mold cavity 2 can be controlled independently from the other mold cavities 2.

As the resin, a polypropylene ("Novatec™ TX1977K", manufactured and sold by Japan Polychem Corporation, Japan) was used. The cylinder temperature was 230° C., the injection pressure was 120 MPa, the mold temperature was 80° C., and the pressure of carbon dioxide gas supplied to the injection cylinder was 10 MPa. Each mold cavity 2 was preliminary pressurized with carbon dioxide gas under a pressure of 7 MPa, and the amount of the resin injected into each mold cavity 2 was controlled so that each mold cavity 2 had a mold cavity filling ratio of about 75%. The foamable polypropylene resin in a molten form (containing carbon dioxide gas) was injected into the mold cavity 2 with an injection time of 2.0 seconds. 1.5 Seconds after the commencement of the injection of the foamable molten resin, a pressurized gas was introduced into the foamable molten resin mass to thereby form a gas-filled hollow 11, and the introduction of the pressurized gas into the gas-filled hollow 11 was continued for 3 seconds. With respect to the above-mentioned pressurized gas used to form the gas-filled hollow, carbon dioxide gas under a pressure of 8 MPa was used. Then, each gas supply valve was closed, and each openable/closable valve 4 in the communication passage connected to each molten resin release cavity 3 was opened, to thereby release the pressurized gas in the gas-filled hollow of the molten resin mass and a portion of the molten resin mass to the molten resin release cavity 3, thereby lowering the pressure exerted on the foamable molten resin mass, so that foaming of the molten resin mass in the mold cavity 2 was caused to occur to form a formed resin mass having a surface skin layer. After 30 seconds from the foaming, the mold 1 was opened and the obtained foamed molded article was taken out therefrom. Thus, a foamed molded article was obtained which had a substantially non-foamed surface skin layer 10 and a highly foamed interior portion.

During the molding, when gas-filled hollows were formed in the molten resin masses in the mold cavities, the lengths of the gas-filled hollows were varied, wherein the difference between the longest hollow and the shortest hollow was 20 mm; however, the obtained foamed molded articles were uniform, that is, all of the obtained foamed molded articles exhibited an expansion ratio (a benchmark of lightweightness) of about 2.2, and a thickness of surface skin layer of 2.5 mm.

The carbon dioxide gas content of the foamable molten resin was about 3.0% by weight.

EXAMPLE 8

A foamed molded article was produced in substantially the same manner as in Example 2, except that the production conditions were modified as mentioned below. After the openable/closable valve 4 in the communication passage 5 connected to the molten resin release cavity 3 was opened, the introduction of carbon dioxide gas into the gas-filled hollow 11 of the molten resin mass 8 was continued for further 15 seconds, and then, the carbon dioxide gas was released to the molten resin release cavity 3, immediately followed by opening of the mold 1 and taking-out of the obtained foamed molded article. The obtained foamed molded article had a non-foamed surface skin layer and a foamed interior portion having an open-cellular structure. The temperature of the surface of the obtained foamed molded article was 60° C., which was 20° C. lower than the mold temperature, and this shows the cooling effect of the adiabatic expansion of carbon dioxide gas. It was found that, with respect to the obtained foamed molded article, the expansion ratio and the thickness of the surface skin layer were about the same as in Example 2.

EXAMPLE 9

A foamed molded article was produced in substantially the same manner as in Example 2, except that the production conditions were modified as mentioned below. The mold cavity 2 was pressurized with nitrogen gas under a pressure of 6 MPa, and nitrogen gas under a pressure of 8 MPa was introduced into the molten resin mass from the injection cylinder 20 to thereby form a gas-filled hollow 11 with nitrogen gas under a pressure of 8 MPa. It was found that, with respect to the obtained foamed molded article, the expansion ratio and the appearance were about the same as in Example 2. The nitrogen gas content of the foamable molten resin was about 0.8% by weight.

Comparative Example 1

A foamed molded article was produced in substantially the same manner as in Example 2, except that the production conditions were modified as mentioned below. Instead of opening the openable/closable valve 4 in the communication passage 5 leading to the molten resin release cavity 3, it was attempted that the carbon dioxide gas used to form the hollow 11 was released through the pressurized gas nozzle 13 incorporated in the injection nozzle 12. It was found that, although the foamable molten resin filled in the sprue 6 and the runner 7 was foamed, the interior portion of the obtained molded article was not foamed, and that the molded article burst upon opening of the mold 1. It is considered that the reason of this problem is that the foamable molten resin filled in the sprue 6 and the runner 7 had foamed prior to the foaming of the interior portion of the molten resin mass, and hence the resultant foamed resin in the sprue 6 and the runner 7 prevented the release of the carbon dioxide gas in the gas-filled hollow 11 of the molten resin mass 8.

Comparative Example 2

A foamed molded article was produced in substantially the same manner as in Example 2, except that the production conditions were modified as mentioned below. The molten resin release cavity 3 was designed to have a length of 70 mm and a cavity volume of 28 CC. The mold cavity filling ratio of the molten resin was 98%. After the injection of the molten resin into the mold cavity was performed and the introduction of the pressurized gas into the injected molten resin mass was started, the openable/closable valve 4 was opened to release a portion of the molten resin mass under the pressure exerted by the pressurized gas to the molten resin release cavity 3, to thereby form a hollow in the foamable molten resin mass with a hollow ratio of about 30%. At this point, the molten resin release cavity 3 was completely filled with the resin which was pressed by the pressurized gas. Then, the carbon dioxide gas used for forming the hollow 11 was released through the pressurized gas nozzle 13 incorporated in the injection nozzle 12. It was found that, although the foamable molten resin filled in the sprue 6 and the runner 7 was foamed, the interior portion of the obtained molded article was not foamed, and that the molded article burst upon opening of the mold 1. It is considered that the reason of this problem is that the foamable molten resin filled in the sprue 6 and the runner 7 had foamed prior to the foaming of the interior portion of the molten resin mass, and hence the resultant foamed resin in the sprue 6 and the runner 7 prevented the release of the carbon dioxide gas in the gas-filled hollow 11 of the molten resin mass 8.

Comparative Example 3

A foamed molded article was produced in substantially the same manner as in Comparative Example 2, except that the production conditions were modified as mentioned below. The pressurized gas used for forming the hollow 11 was introduced into the foamable molten resin mass in the mold cavity 2 directly through the gas inlet 18 (shown in FIG. 1(a)) which opens in the mold cavity 2, and the same gas inlet 18 was also used to release the gas from the gas-filled hollow 11. The results were substantially the same as in Comparative Example 2. That is, it was found that, although the foamable molten resin present near the gas inlet 18 was foamed, the interior portion of the obtained molded article was not foamed, and that the obtained molded article burst upon opening of the mold 1.

EXAMPLE 10

A foamed molded article was produced in substantially the same manner as in Example 3, except that the mold cavity 2 was pressurized with nitrogen gas. It was found that, although the obtained molded article exhibited no foam mark on the surface thereof, the surface roughness of the molded article was only in the range of from 5 to 8 μm, that is, the surface of the molded article did not exhibit a satisfactory reproduction (i.e., transfer) of the grained surface of the inner wall of the mold cavity. This means that, with respect to the reproducibility of the morphology of the inner wall of the mold cavity, Example 3 is more advantageous than Example 10.

The nitrogen gas content of the foamable molten resin was about 3.0% by weight. The obtained foamed molded article exhibited an expansion ratio of 2.6, and its surface skin layer had a thickness of 1.5 mm.

Comparative Example 4

A foamed molded article was produced in substantially the same manner as in Example 3, except that the molten resin release cavity 3 was not used, and that the foamed molded article was taken out of the mold cavity by opening the mold 1 sixty seconds after completion of the injection of the foamable molten resin. It was found that, when the obtained molded article was taken out from the mold, the molded article vigorously foamed and greatly expanded under the foaming pressure exerted by the gaseous foaming agent dissolved in the resin, and thus the molded article was greatly distorted. It was also found that a cooling time of 120 seconds was necessary to prevent such distortion of the molded article.

Comparative Example 5

A foamed molded article was produced in substantially the same manner as in Comparative Example 4, except that the mold cavity 2 was not pressurized with a pressurized gas, and that the mold cavity filling ratio of the molten resin was 80%. It was found that, although the obtained foamed molded article exhibited an expansion ratio of 1.2, its appearance was poor due to the occurrence of a foam mark in the surface portion of the obtained foamed molded article.

Comparative Example 6

A foamed molded article was produced in substantially the same manner as in Comparative Example 5, except that, in an attempt to improve the appearance of the obtained foamed molded article, the mold cavity 2 was pressurized with carbon dioxide gas under a pressure of 7 MPa prior to the injection of the foamable molten resin. It was found that the obtained foamed molded article exhibited no foam mark in the surface of its portion corresponding to a portion of the mold cavity 2 occupying 80% of the volume of the mold cavity 2 as measured from the gate of the mold; however, foam mark appeared in the remainder of the surface of the obtained foamed molded article, that is, the flow front portion of the obtained foamed article had poor appearance.

INDUSTRIAL APPLICABILITY

The foam-injection molding method of the present invention is advantageous not only in that a molded article which exhibits excellent reproduction of the morphology of the inner wall of the mold cavity and which has both a non-foamed surface skin layer and a highly foamed interior portion can be produced with excellent reproducibility and high efficiency and economically, but also in that the thickness of the surface skin layer and the expansion ratio of the molded article can be easily controlled. The foam-injection molding method of the present invention can provide various excellent foam-injection molded articles of a thermoplastic resin at a low cost. Examples of such molded articles include a housing for a light electrical equipment or an electronic equipment, various automobile parts and daily commodities. Further, the foam-injection molding method of the present invention can be advantageously used not only for molding ordinary thermoplastic resins, but also for molding various resin compositions which contain a flame retardant having a low thermal stability and hence which cannot be molded at high molding temperatures, and for molding various resins having such a low fluidity that it is difficult to mold the resins by a conventional injection molding method.

The invention claimed is:

1. A method for foam-injection molding a thermoplastic resin, comprising:
   (1) providing a mold comprising a fixed mold half and a movable mold half mating with said fixed mold half to thereby form a mold cavity defined by an inner wall of the fixed mold half and an inner wall of the movable mold half,
   said mold cavity having an inner wall and communicating with a resin inlet,
   said inner wall of said mold cavity having a molten resin releasing means,
   (2) injecting a foamable thermoplastic resin in a molten form, under preselected injection temperature and pressure conditions, into said mold cavity of said mold through said resin inlet in an amount which is in the range of from 95 to 110% of the weight of the foamable molten resin having a resin volume equal to the volume of said mold cavity, wherein the resin volume is as measured under said preselected injection temperature and pressure conditions,
   thereby forming a foamable molten resin mass in said mold cavity,
   (3) applying a pressure to said foamable molten resin mass in said mold cavity to press the surface of said foamable molten resin mass against said inner wall of said mold cavity, thereby allowing a surface portion of said foamable molten resin mass to be solidified to form a surface skin layer of said foamable molten resin mass, and
   (4) releasing a portion of said foamable molten resin mass under the foaming pressure exerted by said foamable molten resin mass to the outside of said mold cavity through said molten resin releasing means, thereby lowering the pressure exerted on the foamable molten resin mass, so that foaming of the foamable molten resin mass in the mold cavity is caused to occur to form a foamed resin mass having said surface skin layer remaining substantially non-foamed,
   wherein said molten resin releasing means of said mold cavity is an openable/closable valve, and wherein said mold has a molten resin release cavity which communicates with said mold cavity through said openable/closable valve, the volume of said molten resin release cavity being larger than the volume of said portion of the foamable molten resin mass which is released through said openable/closable valve to the outside of said mold cavity in step (4), and
   wherein said molten resin release cavity has a gas passage communicating with the outside of said mold.

2. The method according to claim 1, wherein the application of a pressure to said foamable molten resin mass in step (3) is effected by injecting an additional amount of foamable molten resin into the mold cavity, thereby applying a predetermined resin holding pressure to the foamable molten resin mass.

3. The method according to claim 1 or 2, wherein, before step (2) and after step (1), a pressurized gas is introduced to said mold cavity so that said mold cavity is caused to have a pressure such that, in step (2), foaming of said foamable molten resin injected into said mold cavity does not occur at a flow front thereof.

4. The method according to claim 3, wherein said pressurized gas introduced to said mold cavity before step (2) and after step (1) is carbon dioxide gas.

5. The method according to claim 1, wherein said foamable molten resin comprises a molten resin and, dissolved therein, at least one gaseous foaming agent which is selected from the group consisting of carbon dioxide gas and nitrogen gas.

6. The method according to claim 5, wherein the content of said foaming agent in said foamable molten resin is in the range of from 0.05 to 10% by weight.

7. A method for foam-injection molding a thermoplastic resin, comprising:
   (1) providing a mold comprising a fixed mold half and a movable mold half mating with said fixed mold half to thereby form a mold cavity defined by an inner wall of the fixed mold half and an inner wall of the movable mold half,
   said mold cavity having an inner wall and communicating with a resin inlet and optionally with a gas inlet,
   said inner wall of said mold cavity having a molten resin releasing means, (2) injecting a foamable thermoplastic resin in a molten form, under preselected injection temperature and pressure conditions, into said mold cavity of said mold through said resin inlet in an amount which is in the range of from 55 to 110% of the weight of the foamable molten resin having a resin volume equal to the volume of said mold cavity, wherein the resin volume is as measured under said preselected injection temperature and pressure conditions, thereby forming a foamable molten resin mass in said mold cavity, (3) introducing a pressurized gas, through said resin inlet or said gas inlet, into said foamable molten resin mass in said mold cavity to form a gas-filled hollow in said foamable molten resin mass, thereby exerting a pressure on said foamable molten resin mass to press the outer surface of said foamable molten resin mass against said inner wall of said mold cavity, thereby allowing an outer surface portion of said foamable molten resin mass to be solidified to form a surface skin layer of said foamable molten resin mass, wherein said step (3) is performed during step (2), after completion of step (2), or during and after step (2), and (4) releasing a portion of said foamable molten resin mass and at least a portion of the pressurized gas in the gas-filled hollow, under the foaming pressure exerted by said foamable molten resin mass and the pressure of the pressurized gas in said gas-filled hollow, to the outside of said mold cavity through said molten resin releasing means, thereby lowering the pressure exerted on the foamable molten resin mass, so that foaming of the foamable molten resin mass in the mold cavity is caused to occur to form a foamed resin mass having said surface skin layer remaining substantially non-foamed, wherein said molten resin releasing means of said mold cavity is an openable/closable valve, and wherein said mold has a molten resin release cavity which communicates with said mold cavity through said openable/closable valve, the volume of said molten resin release cavity being larger than the volume of said portion of the foamable molten resin mass which is released through said openable/closable valve to the outside of said mold cavity in step (4), and wherein said molten resin release cavity has a gas passage communicating with the outside of said mold.

8. The method according to claim 7, wherein said pressurized gas used in step (3) is carbon dioxide gas.

9. The method according to claim 7 or 8, wherein, before step (2) and after step (1), a pressurized gas is introduced to said mold cavity so that said mold cavity is caused to have a pressure such that, in step (2), foaming of said foamable molten resin injected into said mold cavity does not occur at a flow front thereof.

10. The method according to claim 9, wherein said pressurized gas introduced to said mold cavity before step (2) and after step (1) is carbon dioxide gas.

11. The method according to claim 7, wherein said foamable molten resin comprises a molten resin and, dissolved therein, at least one gaseous foaming agent which is selected from the group consisting of carbon dioxide gas and nitrogen gas.

12. The method according to claim 11, wherein the content of said foaming agent in said foamable molten resin is in the range of from 0.05 to 10% by weight.

* * * * *